United States Patent
Freund

(10) Patent No.: US 7,340,770 B2
(45) Date of Patent: Mar. 4, 2008

(54) SYSTEM AND METHODOLOGY FOR PROVIDING COMMUNITY-BASED SECURITY POLICIES

(75) Inventor: Gregor Freund, San Francisco, CA (US)

(73) Assignee: Check Point Software Technologies, Inc., Redwood City, CA (US)

( * ) Notice: Subject to any disclaimer, the term of this patent is extended or adjusted under 35 U.S.C. 154(b) by 932 days.

(21) Appl. No.: 10/249,882

(22) Filed: May 14, 2003

(65) Prior Publication Data

US 2004/0019807 A1    Jan. 29, 2004

Related U.S. Application Data

(60) Provisional application No. 60/380,962, filed on May 15, 2002.

(51) Int. Cl.
*G06F 9/00* (2006.01)
*G04L 9/00* (2006.01)

(52) U.S. Cl. .......................... 726/11; 726/14
(58) Field of Classification Search ............ 726/11, 726/14
See application file for complete search history.

(56) References Cited

U.S. PATENT DOCUMENTS

| | | | |
|---|---|---|---|
| 5,864,683 A | 1/1999 | Boebert et al. ............ 709/249 |
| 5,898,830 A | 4/1999 | Wesinger et al. .......... 713/201 |
| 5,987,440 A | 11/1999 | O'Neil et al. ............. 705/44 |
| 5,987,611 A * | 11/1999 | Freund ..................... 726/4 |
| 6,009,177 A | 12/1999 | Sudia ...................... 713/191 |
| 6,052,788 A | 4/2000 | Wesinger et al. .......... 713/201 |
| 6,134,327 A | 10/2000 | Van Oorschot ............ 380/30 |
| 6,202,157 B1 | 3/2001 | Brownlie et al. .......... 713/201 |
| 6,215,872 B1 | 4/2001 | Van Oorschot ............ 380/30 |
| 6,226,745 B1 | 5/2001 | Wiederhold ............... 713/200 |
| 6,317,829 B1 | 11/2001 | Van Oorschot ............ 713/155 |
| 6,519,571 B1 | 2/2003 | Guheen et al. ............ 705/14 |
| 6,535,227 B1 | 3/2003 | Fox et al. ................. 345/736 |
| 6,536,037 B1 | 3/2003 | Guheen et al. ............ 717/151 |
| 6,574,617 B1 | 6/2003 | Immerman et al. ........ 707/1 |
| 6,606,744 B1 | 8/2003 | Mikurak ................... 327/534 |
| 6,609,198 B1 | 8/2003 | Wood et al. .............. 349/96 |
| 6,738,908 B1 * | 5/2004 | Bonn et al. ............... 726/4 |
| 6,772,345 B1 * | 8/2004 | Shetty ..................... 726/24 |

* cited by examiner

*Primary Examiner*—Gilberto Barron
*Assistant Examiner*—Devin Almeida
(74) *Attorney, Agent, or Firm*—John A. Smart

(57) ABSTRACT

A system and methodology for providing community-based security policies is described. In one embodiment in a system comprising a plurality of devices connected to a network, a security module is provided for establishing security settings for regulating network access at these devices. Information is collected from at least some the devices about the security settings established on such devices and consensus security settings are generated based upon the collected information. In response to a request for network access at a particular device, determining whether or not to permit network access is based, at least in part, upon the consensus security settings.

40 Claims, 9 Drawing Sheets

SYSTEM AND METHODOLOGY FOR PROVIDING COMMUNITY-BASED SECURITY POLICIES

CROSS REFERENCE TO RELATED APPLICATIONS

The present application is related to and claims the benefit of priority of the following commonly-owned, presently-pending provisional application(s): application Ser. No. 60/380,962, filed May 15, 2002, entitled "System And Methodology For Providing Community-Based Security Policies", of which the present application is a non-provisional application thereof. The present application is related to the following commonly-owned, presently-pending application(s): application Ser. No. 09/944,057, filed Aug. 30, 2001, entitled "System Providing Internet Access Management with Router-based Policy Enforcement"; application Ser. No. 10/003,161, filed Nov. 14, 2001, entitled "System and Methodology for Automatic Local Network Discovery and Firewall Reconfiguration for Mobile Computing Devices". The disclosures of each of the foregoing applications are hereby incorporated by reference in their entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF INVENTION

1. Field of the Invention

The present invention relates generally to information processing and, more particularly, to systems and methods for security policies for regulating access and maintaining security of computer systems connected to networks using a community-based approach to influence the setting of security policies.

2. Description of the Background Art

The first computers were largely stand-alone units with no direct connection to other computers or computer networks. Data exchanges between computers were mainly accomplished by exchanging magnetic or optical media such as floppy disks. Over time, more and more computers were connected to each other using Local Area Networks or "LANs". In both cases, maintaining security and controlling what information a computer user could access was relatively simple because the overall computing environment was limited and clearly defined.

In traditional computing networks, a desktop computer largely remained in a fixed location and was physically connected to a single local network (e.g., via Ethernet). More recently, however, an increasingly large number of business and individual users are using portable computing devices, such as laptop computers, that are moved frequently and that connect into more than one network. For example, many users now have laptop computers that can be connected to networks at home, at work, and in numerous other locations. Many users also have home computers that are remotely connected to various organizations from time to time through the Internet. The number of computing devices, and the number of networks that these devices connect to, has increased dramatically in recent years.

In addition, various different types of connections may be utilized to connect to these different networks. A dial-up modem may be used for remote access to an office network. Various types of wireless connectivity, including IEEE (Institute of Electrical and Electronics Engineers) 802.11 and Bluetooth, are also increasingly popular. Wireless networks often have a large number of different users. Moreover, connection to these networks is often very easy, as connection does not require a physical link. Wireless and other types of networks are frequently provided in cafes, airports, convention centers, and other public locations to enable mobile computer users to connect to the Internet. Increasingly, users are also using the Internet to remotely connect to a number of different systems and networks. Thus, it is becoming more common for users to connect to a number of different networks from time to time through a number of different means.

One of the implications of this increasing number of devices occasionally connected to different networks is that traditional corporate firewall technologies are no longer effective. Traditional firewall products guard a boundary (or gateway) between a local network, such as a corporate network, and a larger network, such as the Internet. These products primarily regulate traffic between physical networks by establishing and enforcing rules that regulate access based upon the protocol and type of acccess request, the source requesting access, the connection port to be accessed, and other factors. For example, a firewall may permit access to a particular computer using TCP/IP on TCP port 80, but deny remote access to other computers on the network. A firewall may also permit access from a specific IP address or range (or zone) of IP addresses, but deny access from other addresses. Different security rules may be defined for different zones of addresses. However, traditional firewall technology guarding a network boundary does not protect against traffic that does not traverse that boundary. It does not regulate traffic between two devices within the network or two devices outside the network. A corporate firewall provides some degree of protection when a device is connected to that particular corporate network, but it provides no protection when the device is connected to other networks.

One security measure that has been utilized by many users is to install a personal firewall (or end point security) product on a computer system to control traffic into and out of the system. An end point security product can regulate all traffic into and out of a particular computing device. For example, an end point security product may expressly seek authorization from a user or administrator (or from a policy established by a user or administrator) for each network connection to or from a computing device, including connections initiated from the device and those initiated from external sources. This enables a user or administrator to monitor what applications on a device are accessing other machines or networks (e.g., the Internet). It also enforces security by obtaining authorization for each Internet or network connection opened to (or from) the device, including connections initiated both internally and externally. In the home environment, for instance, an end point security product enables a home user to monitor the applications he or she is using and enforces security by requiring his or her authorization for each connection. Typically, for connections initiated from the device, a user may configure application permission rules that permit certain applications to connect to one or more networks or devices, such as a local area network (LAN) or a wide area network (WAN), such as the Internet. These application permission rules may, for instance, permit a particular application, such as a Web browser program, to open connections to the Internet. A rule may also be configured to permit an application to access another computer on the same LAN, but prohibit this application from opening an Internet connection.

End point security products are becoming increasingly popular as a means of securing an individual computing device or as part of a security solution for a corporate network or similar group of computers serving a particular organization. Despite the increasing popularity of end point security products, some issues remain. One issue for users of end point security products is that users (or administrators in the case of managed systems) are asked to make decisions about access privileges for a number of different applications. Frequently, these users do not have the experience or information necessary to make informed decisions about access privileges for all of these different applications. As a result, in an effort to maintain security many users are either overly conservative or overly permissive in establishing access privileges and other security settings.

If a user is overly conservative, he or she may block legitimate applications from accessing other devices or resources, or may establish settings which provide for frequent prompts as to whether or not access by a particular application should be permitted. An overly conservative configuration which results in repeated prompts (i.e., alerts) to a user can be frustrating as it may delay his or her performance of various tasks. This type of overly conservative configuration may also be problematic as the user may become accustomed to allowing access (e.g., by selecting "allow" instead of "block") in response to these frequent connection alerts. This can result in security breaches as the user's response may become reflexive. He or she may allow access in response to every alert rather than to carefully examine the specifics of the request for access.

On the other hand, a user may also be overly permissive in making decisions regarding access rights and other security settings. A user may fail to recognize harmful applications that represent serious security threats, or the user may not configure his or her end point security product to provide sufficient protection against inappropriate requests for access. For example, a user may not recognize "Trojan horse" or "spy ware" applications as such malicious applications often are disguised to hide their true nature behind plausible names and publisher information. In either case, the user may fail to take the proper steps necessary to be adequately protected from harmful code or other malicious activities because he or she may lack the necessary information or experience to evaluate what types of access should be permitted.

Existing solutions, to the extent they have focused on these problems, have primarily been focused on the network layer and, more particularly, on well-known attacks on the networking layer. These prior solutions have not attempted to provide a solution that regulates or provides guidance about whether a particular application should (or should not) be able to open connections or obtain access to other resources. Increasingly, however, malicious attacks are not using proprietary protocols to communicate, but rather are using commonly used protocols like HTTP (HyperText Transfer Protocol). As a result, it is increasingly difficult to distinguish good and bad traffic at the network layer without knowing the specific application (or program) that is initiating the communication. This presents particular problems to home and small business users with limited technical skills and resources. Mobile users that frequently connect to a number of different networks and applications are also forced to make decisions about access rights more frequently. Moreover, many programs (applications) now installed by these users include automatic update features in which the program initiates a connection to a remote machine to check for program updates. This further increases the burden placed on users, particularly users having unmanaged environments and without significant technical expertise, in appropriately determining program access rights.

One possible solution to this problem is to provide a description of all known legitimate and illegitimate applications that a user could consult in determining whether or not to permit a certain level of access by a particular application. However, the universe of legitimate applications is too large and changes too frequently to create and maintain a comprehensive database of all legitimate applications. Describing and documenting all illegitimate applications is an even more daunting task.

What is required is a solution that will provide users with guidance about proper use and configuration of a program to facilitate better use of such program. For example, providing advice to a user of an end point security program about which applications should be provided with access rights enables the user to make better decisions about use and configuration of such security program. Ideally, the solution should provide an easy to use mechanism for users to provide feedback and obtain consensus recommendations from other users. For example, a solution providing advice to users of an end point security product should ideally enable many requests for access to be automatically resolved without requiring the user to be asked specifically about each and every request for access. The present invention fulfills these and other needs.

SUMMARY OF INVENTION

A system and methodology for providing community-based security policies is described. In one embodiment in a system comprising a plurality of devices connected to a network, a security module is provided for establishing security settings for regulating network access at these devices. Information is collected from at least some the devices about the security settings established on such devices and consensus security settings are generated based upon the collected information. In response to a request for network access at a particular device, determining whether or not to permit network access is based, at least in part, upon the consensus security settings.

In another embodiment, a system for managing access to resources on a per program basis comprises: a plurality of computers capable of connecting to resources; a policy module enabling security policies to be defined at the plurality of computers; a voting module collecting the security policies from said plurality of computers and generating a community-based security policy based upon the collected security policies; and an enforcement module for trapping a request for access to resources from a particular program at a particular computer and determining whether to permit access to the resources based, at least in part, upon the community-based security policy.

In another embodiment, a method for assisting a user in configuring a program is described. A configuration module is provided at a plurality of computers connected to a network which enables a user to adopt configuration settings for the program. Votes are collected from at least some users of the program based upon the configuration settings adopted by such users. Recommended configuration settings are generated by tallying the collected votes. The recommended configuration settings are displayed at a particular computer connected to the network to assist a user in configuring the program.

DETAILED DESCRIPTION

Glossary

Figure 1:
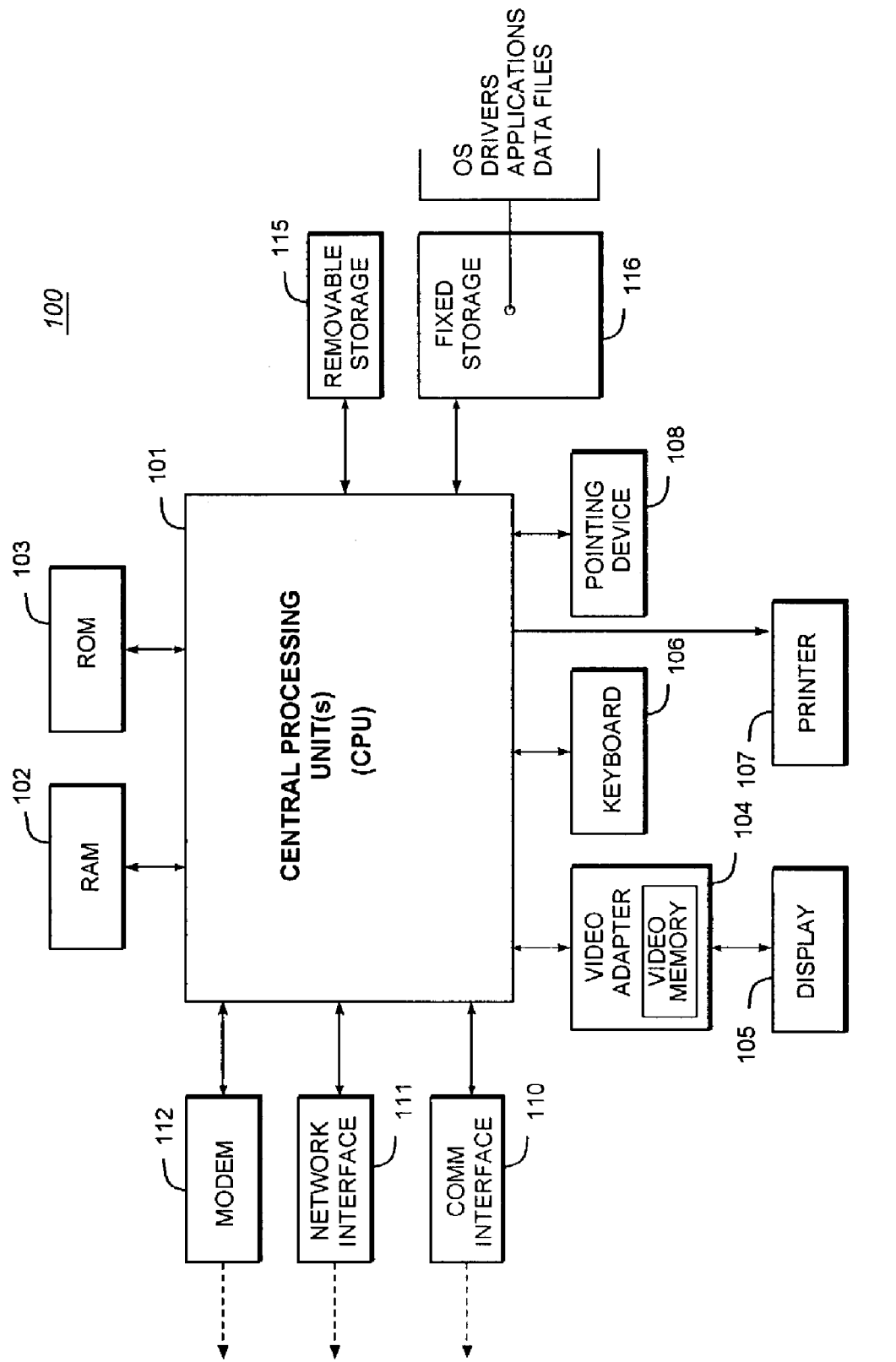
FIG. 1 is a block diagram of a computer system in which software-implemented processes of the present invention may be embodied.

The following definitions are offered for purposes of illustration, not limitation, in order to assist with understanding the discussion that follows.

End point security: End point security is a way of managing and enforcing security on each computer instead of relying upon a remote firewall or a remote gateway to provide security for the local machine or environment. End point security involves a security agent that resides locally on each machine. This agent monitors and controls the interaction of the local machine with other machines and devices that are connected on a LAN or a larger wide area network (WAN) such as the Internet in order to provide security to the machine.

Firewall: A firewall is a set of related programs, typically located at a network gateway server, that protects the resources of a private network from other networks by controlling access into and out of the private network. (The term also implies the security policy that is used with the programs.) A firewall, working closely with a router program, examines each network packet to determine whether to forward it toward its destination. A firewall may also include or work with a proxy server that makes network requests on behalf of users. A firewall is often installed in a specially designated computer separate from the rest of the network so that no incoming request directly accesses private network resources.

HTTP: HTTP is the acronym for HyperText Transfer Protocol, which is the underlying communication protocol used by the World Wide Web on the Internet. HTTP defines how messages are formatted and transmitted, and what actions web servers and browsers should take in response to various commands. For example, when a user enters a URL in his or her browser, this actually sends an HTTP command to the web server directing it to fetch and transmit the requested web page. Further description of HTTP is available in "RFC 2616: Hypertext Transfer Protocol—HTTP/1.1", the disclosure of which is hereby incorporated by reference. RFC 2616 is available from the World Wide Web Consortium (W3C), and is currently available via the Internet at www.w3.org/Protocols/. Additional description of HTTP is available in the technical and trade literature, see e.g., Stallings, W. "The Backbone of the Web", BYTE, October 1996, the disclosure of which is hereby incorporated by reference.

MD5: MD5 is a message-digest algorithm which takes as input a message of arbitrary length and produces as output a 128-bit "fingerprint" or "message digest" of the input. The MD5 algorithm is used primarily in digital signature applications, where a large file must be "compressed" in a secure manner before being encrypted with a private (secret) key under a public-key cryptosystem. Further description of MD5 is available in "RFC 1321: The MD5 Message-Digest Algorithm," (April 1992), the disclosure of which is hereby incorporated by reference.

Network: A network is a group of two or more systems linked together. There are many types of computer networks, including local area networks (LANs), virtual private networks (VPNs), metropolitan area networks (MANs), campus area networks (CANs), and wide area networks (WANs) including the Internet. As used herein, the term "network" refers broadly to any group of two or more computer systems or devices that are linked together from time to time (or permanently).

Security policy: In general terms, a security policy is an organization's statement defining the rules and practices that regulate how it will provide security, handle intrusions, and recover from damage caused by security breaches. An explicit and well-defined security policy includes a set of rules that are used to determine whether a given subject will be permitted to gain access to a specific object. A security policy may be enforced by hardware and software systems that effectively implement access rules for access to systems and information. Elements of a security policy may include firewall rules and details regarding trusted and untrusted programs, networks, and hosts. These rules and policy details may be stored and enforced on a computer or a network. Further information on security policies is available in "RFC 2196: Site Security Handbook, (September 1997)," the disclosure of which is hereby incorporated by reference. For additional information, see also e.g., "RFC 2704: The KeyNote Trust Management System Version 2," available from the IETF, the disclosure of which is hereby incorporated by reference. A copy of RFC 2704 is currently available from the IETF via the Internet at www.ietf.org/rfc/rfc2704.txt. In this document, "security policy" or "policy" refers to a set of security policies and rules employed by an individual or by a corporation, government entity, or any other organization operating a network or other computing resources.

TCP: TCP stands for Transmission Control Protocol. TCP is one of the main protocols in TCP/IP networks. Whereas the IP protocol deals only with packets, TCP enables two hosts to establish a connection and exchange streams of data. TCP guarantees delivery of data and also guarantees that packets will be delivered in the same order in which they were sent. For an introduction to TCP, see e.g., "RFC 793: Transmission Control Program DARPA Internet Program Protocol Specification", the disclosure of which is hereby incorporated by reference. A copy of RFC 793 is currently available at www.ietf.org/rfc/rfc793.txt.

TCP/IP: TCP/IP stands for Transmission Control Protocol/Internet Protocol, the suite of communications protocols used to connect hosts on the Internet. TCP/IP uses several protocols, the two main ones being TCP and IP. TCP/IP is built into the UNIX operating system and is used by the Internet, making it the de facto standard for transmitting data over networks. For an introduction to TCP/IP, see e.g., "RFC 1180: A TCP/IP Tutorial," the disclosure of which is hereby incorporated by reference. A copy of RFC 1180 is currently available at www.ietf.org/rfc/rfc1180.txt.

URL: URL is an abbreviation of Uniform Resource Locator, the global address of documents and other resources on the World Wide Web. The first part of the address indicates what protocol to use, and the second part specifies the IP address or the domain name where the resource is located.

Voting: Voting is a well-known technique in distributed computing systems and is used in a number of different applications. Weighted voting and multi-dimensional voting are, for instance, used for synchronization in fault-tolerant computer systems. See e.g., Ahamad, et al "Multidimensional Voting", ACM Transactions on Computer Systems, Vol. 9, No. 4, November 1991, pp 399-431, the disclosure of which is hereby incorporated by reference. Internet voting techniques are also known in the industry. See e.g., Juang, W. S. et al "A Secure and Practical Electronic Voting Scheme for Real World Environments" IEICE Transaction on Fundamentals of Electronics, Communications and Computer Science, E80A (1): 64-71, January 1997, the disclosure of which is hereby incorporated by reference. See also e.g., Ray I. et al, "An Anonymous Electronic Protocol for Voting over the Internet", a copy of which is currently available via the Internet at www.cs.colostate.edu/~indrajit/wecwis01.pdf.

Introduction

The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, BeOS, Solaris, UNIX, NextStep, FreeBSD, and the like. Therefore, the description of the exemplary embodiments that follows is for purposes of illustration and not limitation.

Computer-based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 16 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56 K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
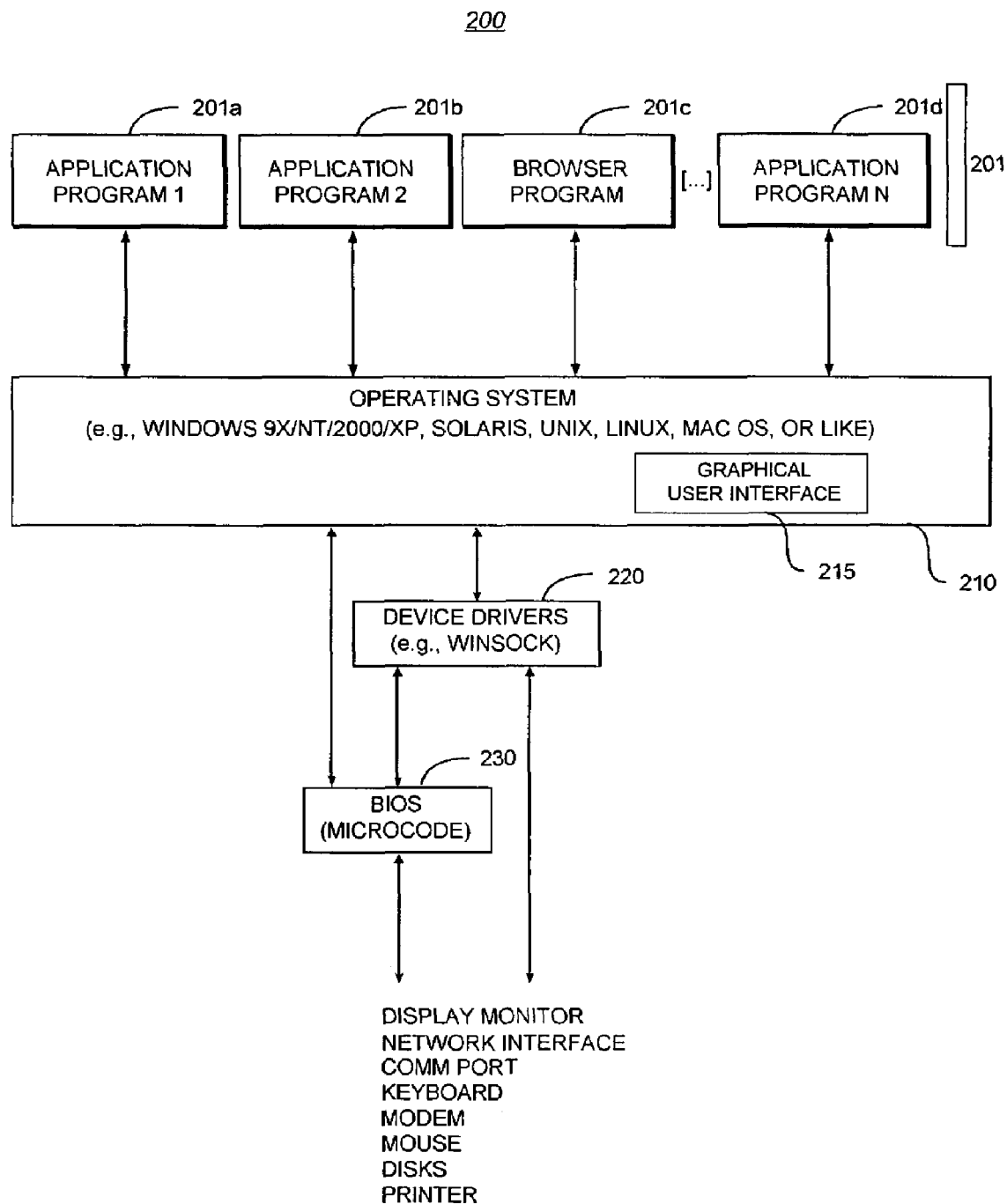
FIG. 2 is a block diagram of a software system for controlling the operation of the computer system.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable computer-executable instructions, for example, for downloading and installation from an Internet location (e.g., Web server).

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., Web server) that communicates with one or more "clients" (e.g., desktop computers). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview

The present invention comprises a system having methods for providing advice to users of a program about configuration (e.g., setting of security policies) and use of such program based upon recommendations of a user community. The present invention may, for example, be used for automatic compilation and sharing of consensus recommendations of users of an end point security program about whether or not a particular program (e.g., application, driver, loadable library, executable file, or the like) should be allowed to access a network (e.g., the Internet). The same methodology may also be used in a large number of other situations. Although the following discussion focuses on the use of the present invention for providing advice for configuration of the security settings of a personal firewall or end point security product, those skilled in the art will appreciate that the system and methodology of the present invention may be applicable in many other situations and environments. Accordingly, the following discussion of an exemplary embodiment of the present invention is for purposes of illustration and not limitation.

The present invention, in its currently preferred embodiment, leverages the collective knowledge of a group or "community" of users of a particular program in order to provide advice regarding proper settings and best practices for use and configuration of such program. Instead of requiring thousands (or millions) of users to individually investigate and make decisions about the same issues in use or configuration of a program, new users can take advantage of the experience of prior users that have already addressed these issues. For example, users of an end point security product may collectively "vote" on which applications should be permitted to access the Internet, and which applications should not be provided with access rights. These votes are collected, tallied, stored (e.g., in a database), and made available to other users systematically using the system and methods of the present invention. This enables new or less experienced users to make more informed decisions and adopt best-practices based upon the prior experience of others in the user community.

In an environment in which users of a particular product include knowledgeable, "power" users as well as less experienced users, the present invention enables less experienced users to take advantage of the expertise of more experienced and knowledgeable power users. Many power users are often early adopters of new technologies and applications and, therefore, are likely to deal with any issues relating to these new technologies before widespread adoption by other users. Accordingly, these users may provide advance information and feedback about these technologies that other users may rely upon. For instance, the vote of prior users about whether or not to permit a particular program to access the Internet may be valuable advice to a new user of this program encountering the issue for the first time.

Like any other voting process, the system of the present invention includes protective measures to ensure that the voting process is conducted fairly, and that problems such as multiple votes, votes by ineligible users, fraud, and the like are avoided. The present invention includes mechanisms to prevent sabotage of the system on which votes are tallied and stored or other malicious activities intended to frustrate its purposes. For example, safeguards to prevent multiple voting are included to avoid the potential problem of a "hacker" placing thousands of votes in favor of permitting access by a malicious program. Similarly, safeguards are provided to protect against a community of hackers or other unauthorized persons unfairly influencing the voting process and, therefore, the guidance provided to product users. In addition, the present invention provides for automation of both the voting process and the process of providing voting results (i.e., the advise or recommendations of the user community) to users, enabling less experienced users to easily obtain and act on this advice.

Another consideration in the implementation of the present invention is to encourage user participation by ensuring their privacy. Users may refrain from voting or otherwise sharing their opinions if they will be personally identified as a result. Accordingly, the approach of the present invention is to provide a collective voting process that does not inappropriately disclose personal information of any particular user participating in the process. Although the source of votes may be examined by the system to validate that a particular user is a legitimate user of the program that should be permitted to vote, information identifying any particular user is generally not disclosed to other users. In this manner, users are encouraged to participate and share their knowledge and experience with other users. The components of the presently preferred embodiment of the system (sometimes referred to below as the "community advisor service" or "CBP" system) of the present invention will now be described.

System Components

Client-Side System Components and Basic Operations

Figure 3:
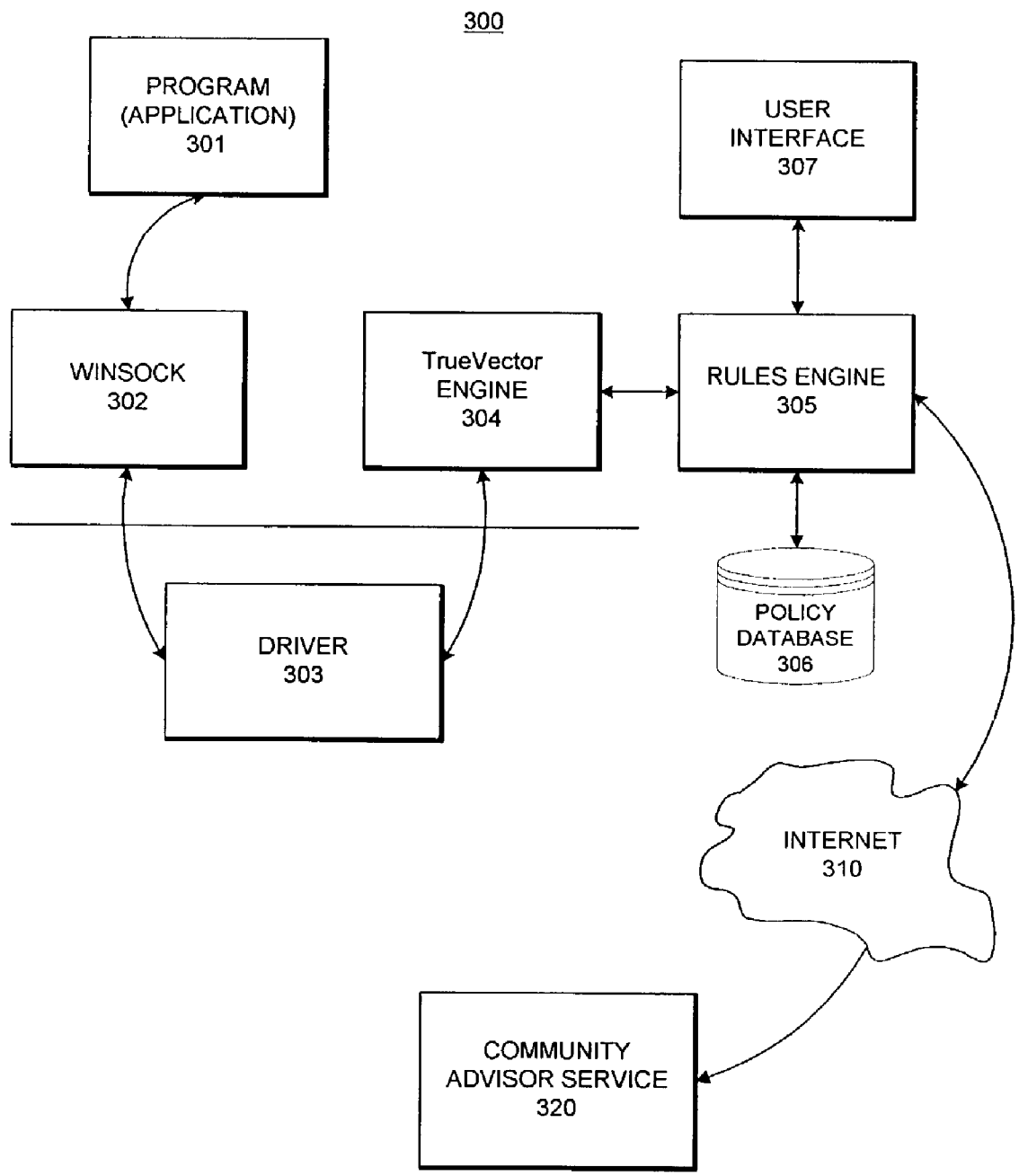
FIG. 3 illustrates an exemplary environment in which the client-side components of the present invention may be embodied.

The system of the present invention, in its currently preferred embodiment, consists of several components. A number of these components are typically installed on a user's computing device (e.g., a personal computer or other client device). Other components are usually installed on servers that may be remotely accessed by users (e.g., over an open network such as the Internet). FIG. 3 illustrates an exemplary environment 300 in which the client-side components of the present invention may be embodied. As shown, client-side components of the present invention include a program (e.g., an application program) 301, a Winsock (or Windows socket API) 302, a driver 303, a TrueVector® engine 304, a rules engine 305, a policy database 306, and a user interface 307. As shown, the rules engine 305 may also connect via the Internet 310 to a community advisor-service 320, which is typically installed remotely on one or more computer servers.

A core component of the currently preferred embodiment of the system is the TrueVector® engine 304 which regulates access to (or from) the client device. When a request for access by a program (e.g., application 301) is detected, the TrueVector® engine 304 evaluates the request for access and determines whether or not access by the application 301 should be permitted. Further description of the operations of the TrueVector engine in regulating access to a network is provided in commonly-owned U.S. Pat. No. 5,987,611, entitled "System and Methodology for Managing Internet Access on a Per Application Basis for Client Computers Connected to the Internet", in commonly-owned U.S. application Ser. No. 09/944,057, filed Aug. 30, 2001, and in commonly-owned U.S application Ser. No. 10/003,161, filed Nov. 14, 2001. The operations of the system of the TrueVector engine 304 and other components of the currently preferred embodiment in detecting and evaluating a request for access may be illustrated by example.

A particular program 301 (e.g., a tax preparation application) on a client device may, for instance, request a connection to the Internet 310 to check for availability of a program update from a remote server. As shown at FIG. 3, the application 301 is connected via a Winsock (Windows socket) interface 302 to a driver 303 that intercepts the request for access from the application 301 and re-directs this request for Internet access to the TrueVector engine 304. When the request forwarded by the driver 303 is received by the TrueVector engine 304, the TrueVector engine 304 determines that a program is requesting access to the Internet and attempts to identify the particular program making the request (e.g., from a unique fingerprint of the application 301). The TrueVector engine 304 may then invoke the rules engine 305 to determine whether or not to permit the access requested by the application 301. Alternatively, the TrueVector engine itself may evaluate the request without invoking an external rules engine.

The rules engine 305, when invoked by the TrueVector engine 304, typically handles such requests for access by first consulting a policy database 306 to determine whether or not this application has previously been evaluated. In the presently preferred embodiment, the policy database 306 indicates if the application has been specifically approved for Internet access, has specifically been blocked (i.e., not approved for access), has not yet been evaluated, or is subject to a policy which provides for asking the user of the device whether or not to permit access. Currently, a user may configure an application permission rule, for one or more application(s) on his or her device, that requires issuance of a notification (e.g., through issuance of an alert or prompt to the user interface 307) requesting a decision from the user as to whether or not to permit such application(s) to access a local (or trusted) zone and/or the Internet. In the presently preferred embodiment, the methodology of the present invention may be invoked in the event a program requesting access has not previously been evaluated, or if the user has established an application permission rule to ask for approval each time access is requested. In some cases, the present invention may also be invoked even if an application has been previously evaluated. For example, a new module of a previously evaluated application (e.g., a new dynamic link library) may request access. In some cases this may be considered as a new application and, therefore, may invoke the methodology of the present invention for obtaining feedback from other users.

When a request for access is received and the policy database 306 indicates that the request is from a new (i.e., not previously evaluated) program, the rules engine 305 often sends an event or alert to the user interface 307. Alternatively, the rules engine 305 may be configured to automatically permit or block particular types of connections based upon rules or logic previously adopted by a user or an administrator. When the rules engine 305 sends an alert to the user interface 307, the alert requests a response from the user as to whether or not the requested access should be permitted. However, if the system of the present invention is installed and operational on the client device, the rules engine 305 may instead consult a community advisor service 320, which is usually available via the Internet as shown at FIG. 3. In this case, the rules engine 305 sends a request (i.e., a "ticket" as described below) via the Internet 310 to the community advisor service 320.

The request sent to the community advisor service 320 includes information about the particular program requesting access and seeks advice about this program (e.g., application 301 in this example). The request typically includes a unique fingerprint or identifier of the program (e.g., application 301) and/or other information such as version number, supplier, and the like. In response to this request, the community advisor service 320 locates available information regarding the application 301 (e.g., via look-up from a database table), which consists of feedback provided by other users that have previously encountered the application. This feedback may include the number of users that have previously seen the application, how many have approved Internet access by the application, and how many have not approved access. In the currently preferred embodiment, the rules engine 305 requests this information from the community advisor service 320 before sending an alert (event) to the user interface 307. However, if the community advisor service 320 is not available or response is delayed, the rules engine 305 typically sends the alert to the user interface 307 after a certain time period with information indicating that information could not be obtained from the community advisor service.

After information has been obtained from the community advisor service 320 (or if the advisor module is not available as described above), an alert may be issued to the user interface 307. Usually, a pop-up alert in the user interface 307 requests a decision from the user as to whether or not to permit access. This alert contains the information provided by the community advisor service 320 about the number of users (or votes) permitting access and those not permitting access. In the currently preferred embodiment, the information displayed includes the percentage of users voting "for" (approving) and "against" (disapproving) access by a particular program (e.g., application 301). As an alternative to issuing an alert to the user interface 307 requesting a decision by the user, the system may also be configured to rely on the advice received from the community advisor service 320. For example, a user may adopt a rule that if more than seventy-five percent (75%) of the votes are in favor of permitting access, then the application will be permitted to access the Internet without any dialog with the user (i.e., without issuance of an alert to the user interface). Those skilled in the art will appreciate that a number of other choices may be made for implementation of the methodology of the present invention in any given environment. A user may want to receive notice of all events, but receive feedback from the community advisor service to make a more informed decision. Another user may prefer not to be interrupted by alerts and therefore rely on the policy recommended by a majority, or some greater percentage, of other users. Various other choices may be made in configuration of the client-side component of the present invention to take advantage of the advice and guidance available from the community advisor service. The server-side components which comprise the community advisor service 320 will now be described in more detail.

Server-side Components and Basic Operations

Figure 4:
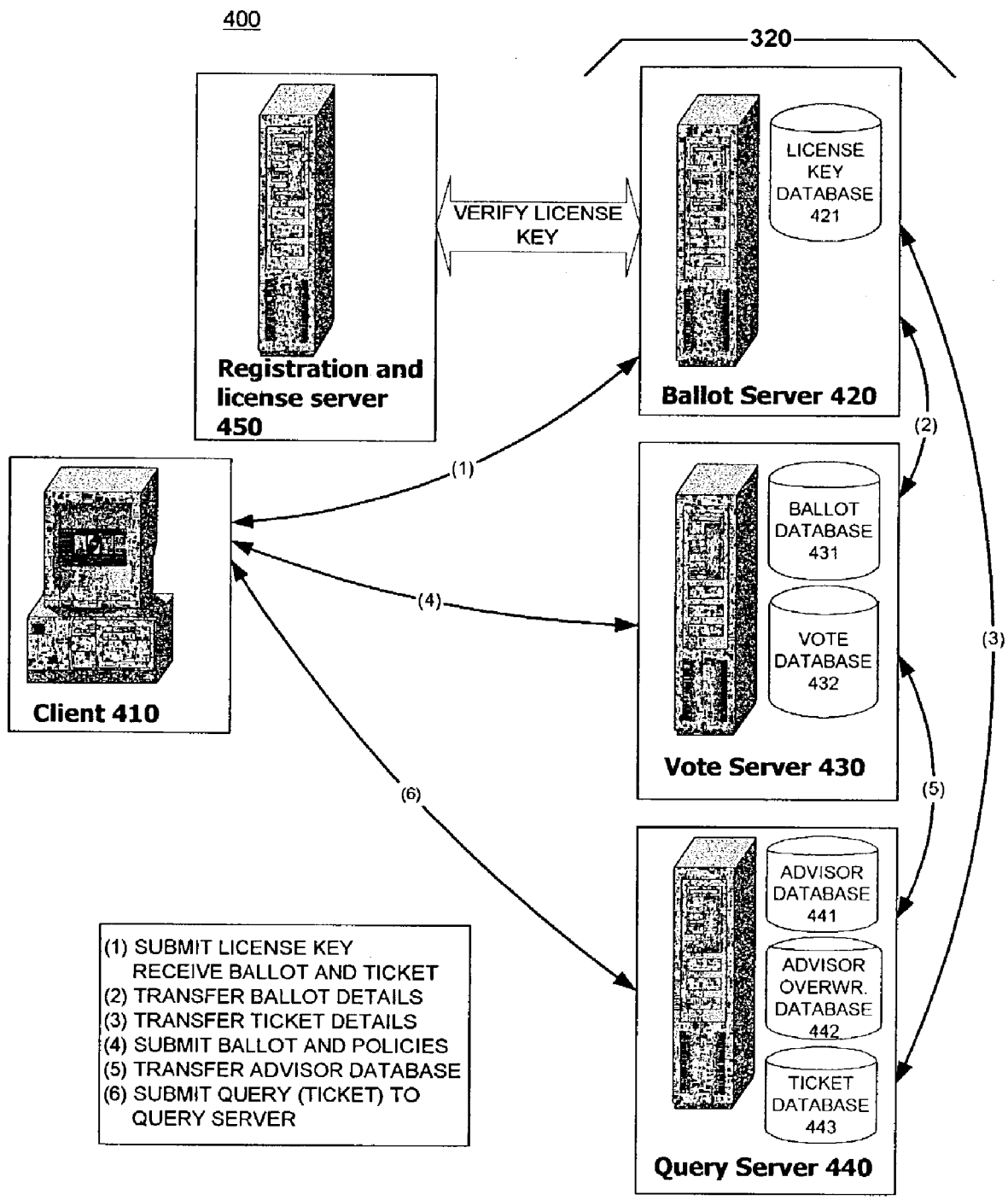
FIG. 4 illustrates an exemplary environment in which the server-side components of the present invention may be embodied.

FIG. 4 illustrates an exemplary environment 400 in which the server-side components of the present invention may be embodied. As shown, the currently preferred embodiment of the community advisor service 320 includes three servers: a ballot server 420, a vote server 430, and a query server 440. The ballot server 420 communicates with client(s) 410 (e.g., via the Internet) and provides eligible clients with ballots and tickets as hereinafter described. The vote server 430 receives ballot information from the ballot server 420 and communicates with the client(s) 410 to obtain feedback (votes) from such client(s). The query server 440 receives ticket information from the ballot server 420 and vote information from the vote server 430. The query server 440 makes vote information (i.e., advice) available to the client(s) 410 in response to a query (ticket) received from such client(s) 410. Environment 400 also includes a registration and license server 450 connected to the ballot server 420 for verification of license key information. Although a single client 410 is shown at FIG. 4, a typical environment includes a plurality of clients that access the community advisor service 320 from time to time. Each of these components and their operation will now be described.

As shown, the ballot server 420 includes a license key database 421 for storing client license key information. The ballot server 420 receives requests from a client 410 (typically via the Internet) and evaluates whether or not the client 410 is eligible to participate in the process (e.g., permitted to vote and/or obtain advice). For instance, a user with an ad-hoc identity may not be eligible, as an ad-hoc identity may enable the user to place multiple votes. The ballot server 420 typically evaluates whether or not a user (e.g., client 410) is eligible to participate by a license number (or key) which is supplied to the user when the product is purchased or activated. To participate in the community advice process, the client 410 is usually required to provide a license number or key to the ballot server. As shown, the ballot server 420 may consult a registration and license server 450 to determine whether or not the client 410 has a valid license and is eligible to participate. The ballot server 420 also takes other steps, such as checking the number of times a license key has been presented, in order to determine that a particular license key is valid and the client 410 should be allowed to access other components of the system. For instance, if the same license key has already voted five times in the last week, then the ballot server 420 may deny access. However, if the client 410 is determined to be eligible to participate, the ballot server 420 provides a ballot and/or a ticket to the client 410. The ballot is used by the client 410 to provide feedback to the vote server 430 (i.e., to vote). The ticket enables the client 410 to obtain information from the query server 440 as described below.

A ballot serves as a unique key or identifier that enables the client 410 to vote (i.e., provide feedback or recommendations to the vote server 430). Similarly, a ticket is another unique key that enables a user to submit queries against (i.e., obtain information from) the query server 440. In the presently preferred embodiment, these unique keys are large, randomly generated numbers that cannot easily be replicated. Although license keys identifying a particular user are utilized to establish eligibility to participate, in the presently preferred embodiment the ballots and tickets issued to a particular user by the ballot server 420 are not associated with the license key in order to protect his or her privacy and encourage participation.

As shown at FIG. 4, the vote server 430 includes a ballot database 431 for storing ballot information and a vote database 432 for storing vote information. A primary role of the vote server 430 is to collect votes (i.e., feedback and related information) from a number of users of a particular program. In order to participate in the voting process, a client 410 presents a ballot issued by the ballot server 420 to the vote server 430. The ballot serves as credentials which enables the client 410 to access the vote server 430 and submit votes consisting of his or her opinions regarding particular issues in the use and configuration of the program (e.g., application, driver, loadable library, executable file, or the like). As shown at FIG. 4, the ballot server 420 also provides a copy of ballot information to the vote server 430. This enables the vote server 430 to determine the legitimacy of a ballot submitted by a user (e.g., client 410) by matching the ballot to the information received from the ballot server 420. In the currently preferred embodiment, once a particular ballot has been voted, the vote server 430 tallies (i.e., records) the vote and then discards the ballot. However, the ballot may alternatively be retained or stored as desired (e.g., for verifying the integrity of the voting process).

A very similar methodology is used for obtaining information from the query server 440. The query server 440 includes an advisor database 441, an advisor overwrite database 442, and a ticket database 443. As shown, information from the vote database 432 is provided by the vote server 430 to the query server 440. This information is typically stored by the vote server in an advisor database 441 and/or an advisor overwrite database 442. The query server 440 also receives a copy of ticket information from the ballot server 420. This enables the query server 440 to validate those users that are eligible to obtain information from the query server 440.

As shown at FIG. 4, the client 410 may submit a ticket received from the ballot server 420 to the query server 440. The query server 440 matches the unique key on the ticket received from the client 410 to information received by the query server 440 from the ballot server 420 before providing information in response to the ticket. Ballots and tickets are handled in a similar fashion by the vote server 430 and the query server 440. However, one difference is that a ballot usually may only be voted once, while a ticket permits multiple queries against the query server 440 within a specific time frame. In the currently preferred embodiment, communications between the client 410 and the community advisor server 320 are encrypted to enhance the security of the system as well as user privacy. The user interface on the client side of the present system will now be described to illustrate the operations of the present invention.

Client User Interface

Figure 5A:
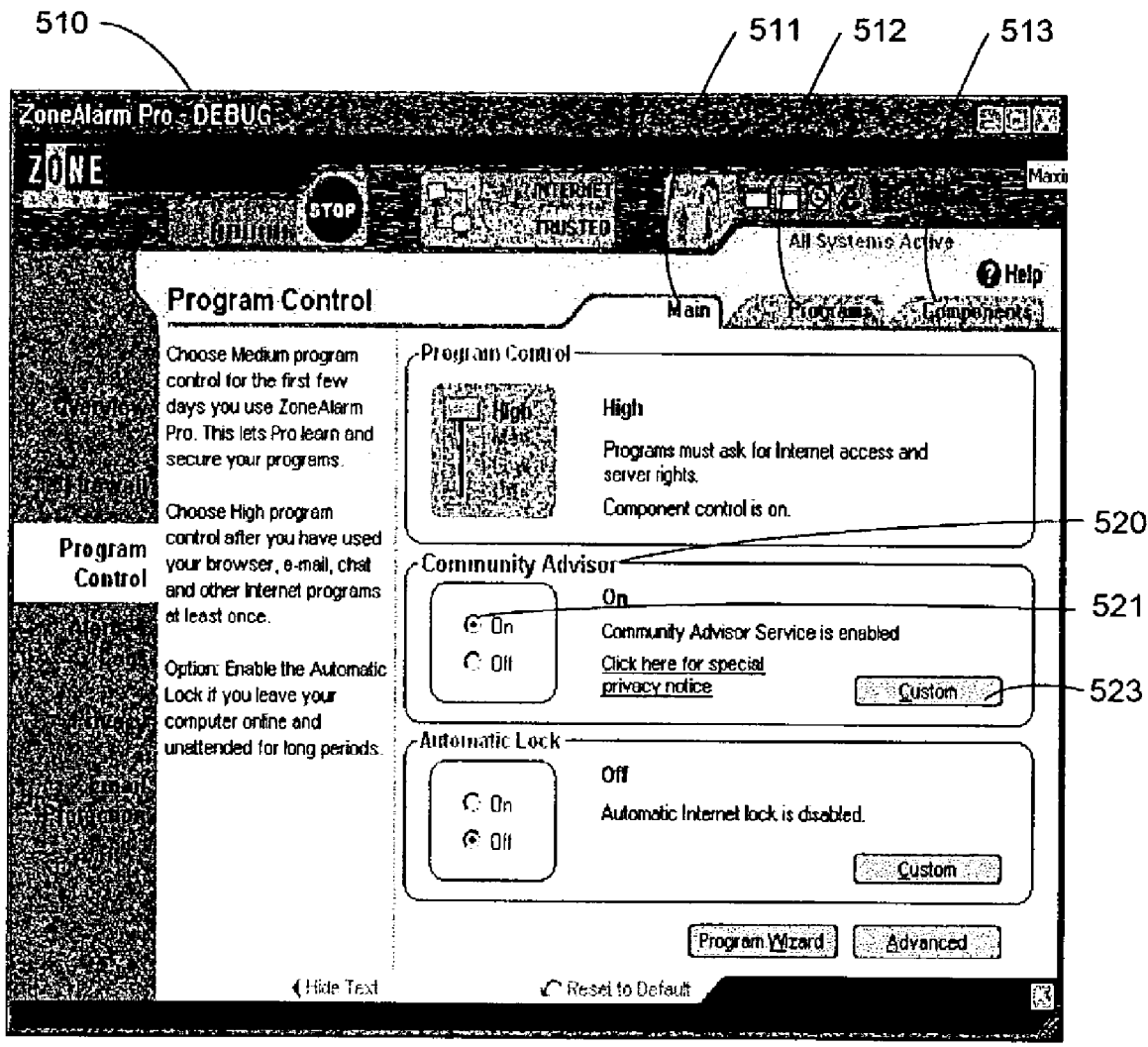
FIGS. 5A-E provide several illustrations or views of the user interface of an exemplary embodiment of the system of the present invention on a client device.

FIGS. 5A-E provide several illustrations or views of the user interface of an exemplary embodiment of the system of the present invention on a client device. FIG. 5A illustrates a "main" program control panel 510 of the currently preferred embodiment. The "main" program control panel 510 is one of a series of program control panels or windows which allows a user to configure program or application access rights. As shown, tabs allow the user to select among several panels. Tab 511 allows the user to select the "main" program control panel 510. Tabs 512 and 513 allow the user to select two other panels referred to as "programs" and "components", respectively. Tab 511 is selected as shown at FIG. 5A, causing the main program control panel 510 to be displayed.

The main program control panel 510 allows a user to enable or disable the community advisor service through a community advisor dialog box 520 provided in the middle of this panel. The community advisor dialog box 520 enables a user to decide whether or not he or she would like to participate in the community advisor service. As shown at FIG. 5A, the "on" button 521 is selected to engage the community advisor service. In an alternative embodiment, a community advisor service may be engaged or disabled by an administrator upon installation or may otherwise be pre-configured by a user or administrator. In the currently preferred embodiment, a single panel is used to enable both voting and querying (i.e., receiving advice). However, those skilled in the art will appreciate that separate panels or buttons could also be used to enable a user to select whether or not he or she wanted to participate in each process. In an alternative embodiment, participation in one or both processes may be pre-configured by a user or administrator. For instance, with a managed installation, an administrator may enable users to submit queries against the query server but not enable voting by such users. The main program control panel 510 also includes a custom button 523 which allows custom configuration of the community advisor service as described in more detail below.

Figure 5B:
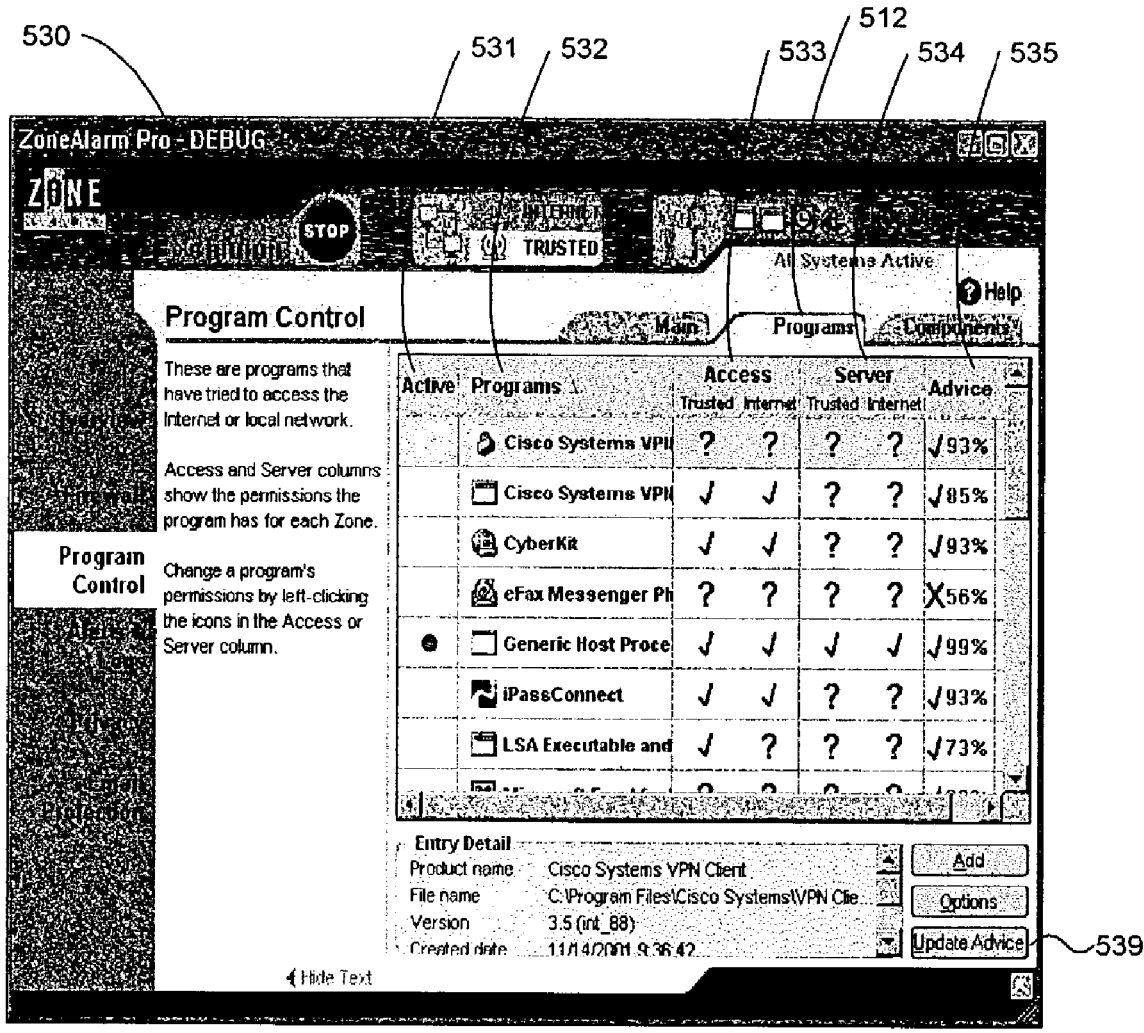

FIG. 5B illustrates a second program control panel of the currently preferred embodiment. As shown, the selection of tab 512 causes the display of this "programs" detail panel or screen 530. The programs detail screen 530 includes an active column 531, a programs column 532, an access column 533, a server column 534, and an advice column 535. Of particular interest to the present invention, the advice column 535 shows, for each particular application (or program) on a device, the community recommendations as to whether or not to permit access by that particular application. For example, the "Cisco Systems VPN" application shown on the first line at FIG. 5B has a percentage of 93% in the advice column 535. This indicates that 93% of the users that have the Cisco Systems VPN application on their device and that participate in the voting process have approved that application for Internet access. As another example, note that the advice column 535 indicates that 56% of the users of the "eFax Messenger" application (as shown on the fourth line of this program detail screen 530) have voted (i.e., chosen) to block access by this application. A user may consult this advice column in manually configuring application access rights. Alternatively, a user may elect to automatically base access decisions upon the community vote or recommendation as hereinafter described.

It should be noted that in the presently preferred embodiment, settings manually entered by a user (and depicted on this screen under the access column 533 and the server column 534 are also used by the vote server as the basis for compiling votes from the user. If a user has used the program control panels to manually configure his or her program permission settings (e.g., whether or not to permit particular applications to access the Internet), these settings are counted as votes (e.g., permitting access is equated to a "yes" vote and denying access is equated to a "no" vote) by the vote server. However, automatic settings, such as settings generated through reliance upon the community advisor service as described below, are not counted by the vote server in order to avoid feedback effects. Only settings manually approved by a user are considered as "recommended" by the user.

Also shown on the lower right corner of FIG. 5B is an update advice button 539. This button allows a user to obtain additional information and advice from the query server. For instance, a user may use the update advice button 539 to obtain information on applications that are not currently installed or active on his or her device. Selecting the update advice button 539 may also enable a user to obtain the most current advice available from an active database (i.e., the query server). In response to the selection of the update advice button 539, the rules engine 305 will initiate a connection to the community advisor service 320 (as previously shown at FIG. 3) in order to obtain updated advice from the community advisor service.

Figure 5C:
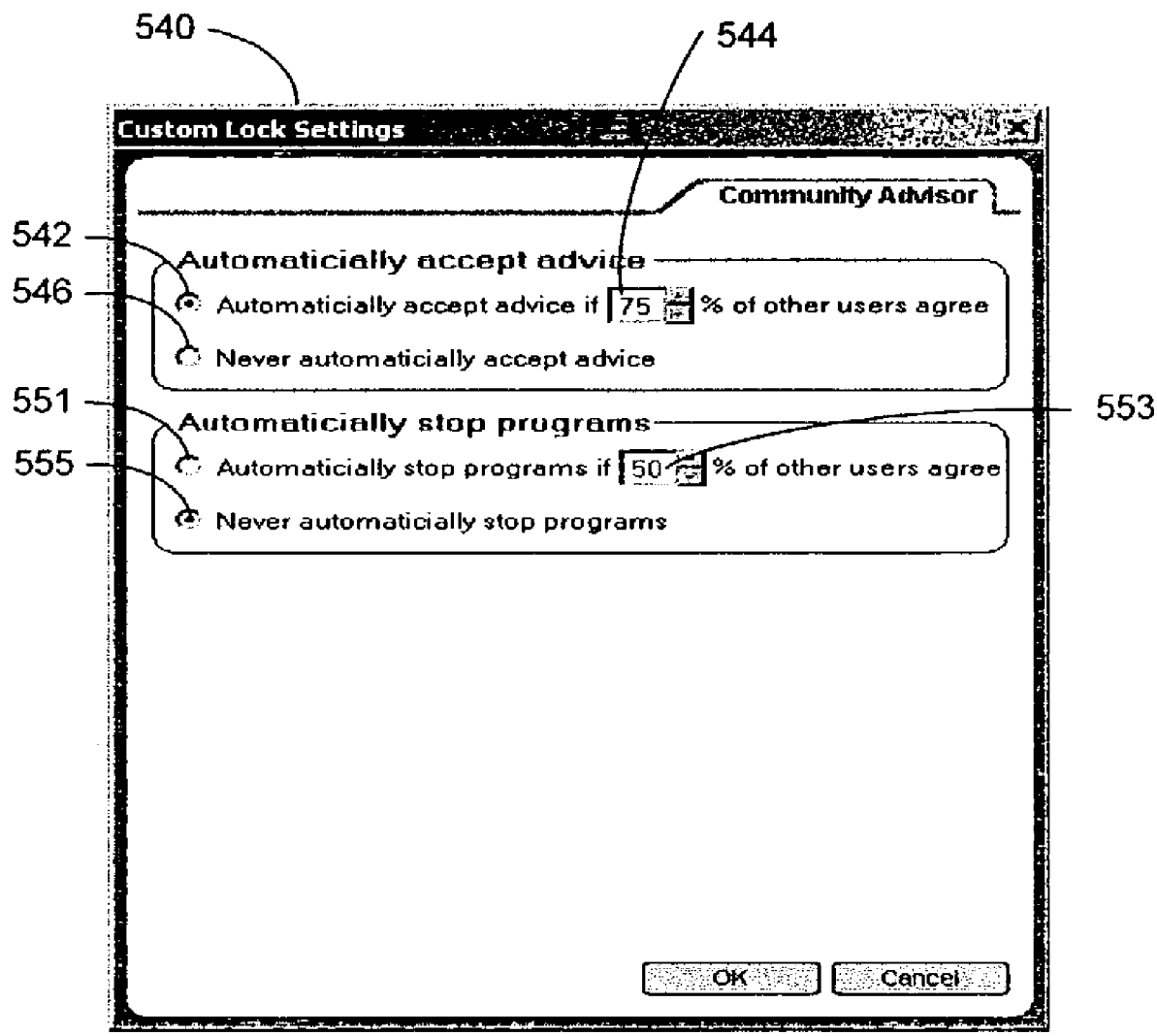

FIG. 5C illustrates a pop-up window 540 of the currently preferred embodiment that is generated when a user selects the custom button 523 in the community advisor dialog box 520 on the main program control panel previously shown at FIG. 5A. This pop-up window 540 includes a button 542 allowing a user to automatically accept advice provided by the community of users of the program (i.e., the community advisor service). A user may select button 542 to automatically rely on the advice to implement particular settings which are adopted by a selected percentage of users. Field 544 may be used to select a specific percentage of other users that are deemed to be reliable. For example, as shown at FIG. 5C, a user may elect to automatically accept advice from the community advisor service if 75% of other users agree to the advice. Although in this example a threshold of 75% is selected, the threshold may be adjusted to a lower or higher percentage by a user through the use of field 544, as desired. Alternatively, a user may select button 546 to never automatically accept community advice.

A user may also select button 551 to provide for automatic blocking of programs if a certain percentage of users elect to block access by a program. In addition, field 553 may be used to select the percentage of users required to block access. However, as illustrated in the example shown at FIG. 5C, a user may also select button 555 never to automatically block access by any programs. If a user selected button 542 to rely on advice from the community and also selected button 555 to never automatically stop programs, the user generally would be asked (e.g., via an alert issued to the user interface) as to whether or not to permit access when such access was requested by applications other than those automatically approved based upon community advice (e.g., those without the 75% community approval as indicated in this example).

Figure 5D:
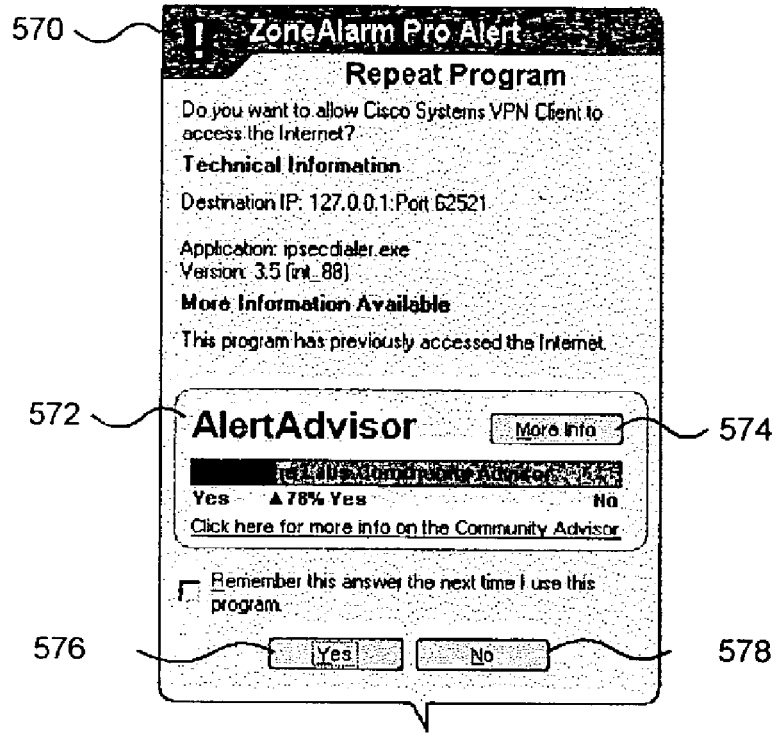
Figure 5E:
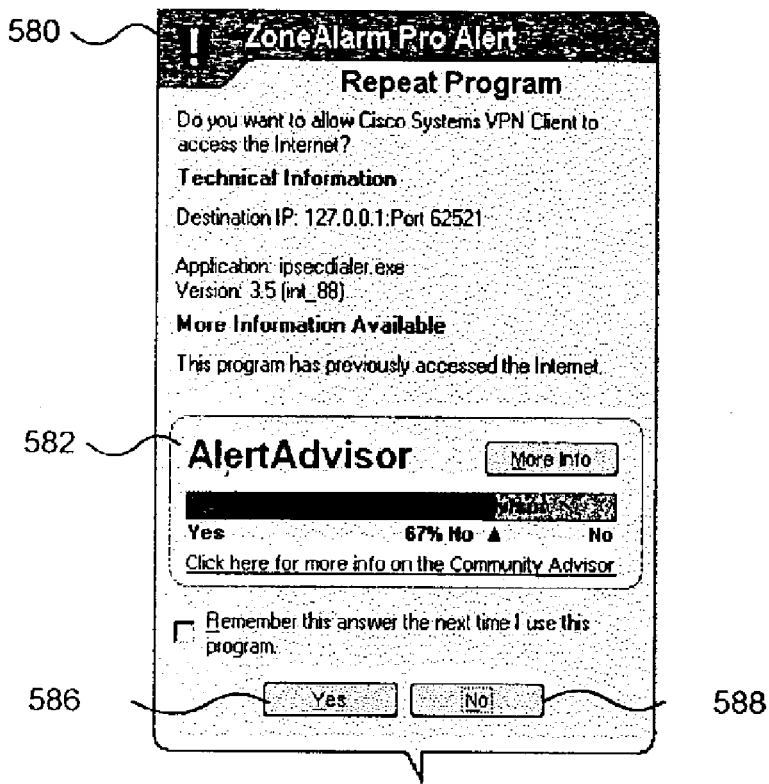

FIGS. 5D-E are screen shots of windows or screens 570, 580 that may be displayed to a user of the system when an alert is issued to the user interface for a decision regarding whether or not to permit access by a particular program. These screen shots illustrate two examples of alerts (or events) issued to the user interface for a decision as to whether or not to permit access by a particular application. Window 570 at FIG. 5D is a pop-up window which is generated by the system of the present invention. As shown, the AlertAdvisor box 572 on screen 570 indicates that 78% of other users have approved a "Cisco Systems VPN Client" program to access the Internet ("78% Yes" as shown in box 572). In this case, the user is prompted for a decision about permitting access because the user either elected not to automatically rely on advice provided by the community advisor service or, alternatively, set a higher threshold (e.g., 80% approval) for automatic approval of access. Additional information may be obtained from the community advisor service by selecting (e.g., clicking on) the "More Info" button 574 on the AlertAdvisor box 572 of this window 570. The user may select "Yes" button 576 to permit the application to access the Internet or "No" button 578 to deny (i.e., block) access.

FIG. 5E depicts a similar example of a pop-up alert window 580 that may be displayed to a user of the system. The pop-up window 580 illustrates another example of the same application (Cisco Systems VPN Client) requesting access to the Internet. However in this case, the AlertAdvisor box 582 indicates that 67% of the other users do not recommend allowing access ("67% No" as shown in box 582). The user may select the "Yes" button 586 to permit the application to access the Internet or the "No" button 588 to block access as previously described. The steps involved in handling a request for Internet access from a device will now be described.

Detailed Operation

Figure 6:
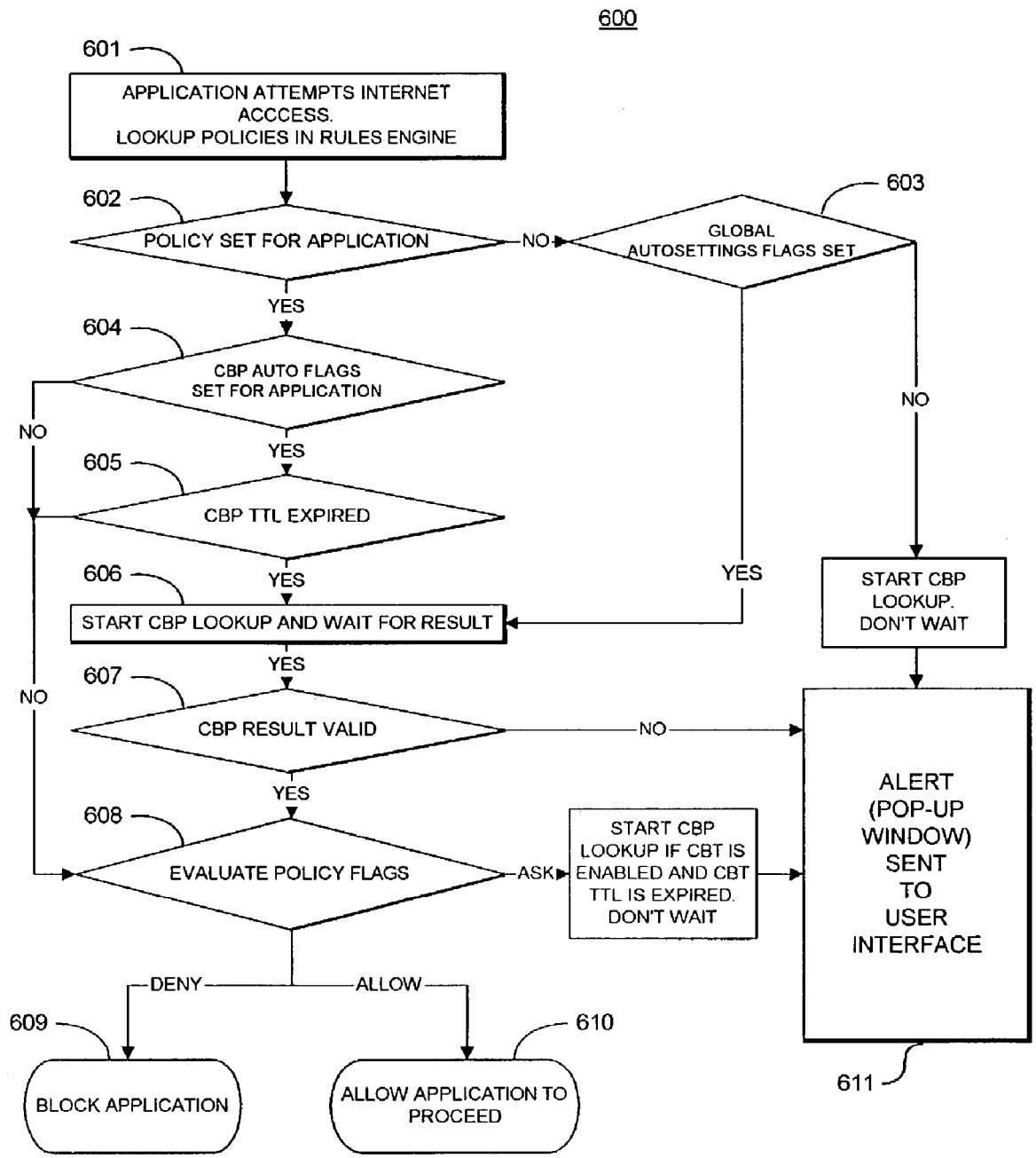
FIG. 6 is a flow diagram illustrating the detailed method steps of operation of the system of the present invention in providing advice and guidance to a user of a particular program

FIG. 6 is a flow diagram 600 illustrating the detailed method steps of operation of the system of the present invention in providing advice and guidance to a user of a particular program. The following description presents method steps that may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server). For purposes of illustrating the operations of the present invention, the following discussion uses as an example a request for access to the Internet by a particular application installed on a device (e.g., on a computing device on which the client-side components of the present invention are in operation) which is evaluated to determine whether or not to permit the application to access the Internet. However, the present invention may also be used in a number of other circumstances and environments. For instance, the present invention may also be applied to a request for access to a local area network (LAN) or other type of network. Accordingly, the following example is for purposes of illustrating the operations of the present invention and not for purposes of limitation.

As shown, the method begins at step 601 when a particular program (e.g., an application program) attempts to access the Internet. An application may attempt to access the Internet in response to a user command or for other reasons. For instance, a number of programs now include functionality which causes the program to automatically initiate a request for Internet access from time to time in order to determine whether or not updates to such program are available (e.g., from a remote server via the Internet). As previously described, a request for access to the Internet by a program may be redirected to the TrueVector engine and rules engine of the present invention for purposes of determining whether or not to permit access.

When a request for access to the Internet is received by the rules engine of the present invention, at step 602 the rules engine examines policies in the policy database to determine if a policy has been set as to whether or not to permit Internet access by this particular program (e.g., application program). As previously described, the methodology of the present invention may be invoked if a new application (i.e., one not previously evaluated) is requesting access to the Internet for the first time. If a policy has been set for the application (e.g., because it has been previously evaluated), the method proceeds to step 604 to determine if "CBP auto flags" are set for this application. In the currently preferred embodiment, "CBP auto flags" are set for a particular application if a user has elected to automatically base an access rights decision on advise received from the community advisor service (e.g., to permit access if permitted by 75% of participating users). Alternatively, if a policy has not been set for an application (e.g., because it is a newly installed application), the method proceeds to step 603 to determine if "global autosettings" flags are set. "Global autosettings" (also referred to as "CBP global autosettings") flags may be set if the user has elected to base access decisions on the recommendations of the community advisor service as previously described. If "global autosettings" flags are set at step 603, the method proceeds to step 606 to commence the process of looking up advice from the community advisor service. However, if the user has not elected to rely on the community advisor service, the method proceeds directly to step 611 as shown at FIG. 6 (i.e., to ask the user as to whether access should be allowed).

On the other hand, if a policy has been set for an application at step 602 and "CBP auto flags" are not set for the application at step 604, this means that a user has previously established a policy setting (e.g., made a decision by manual selection) as to whether or not to permit access. In this event, the method proceeds to step 608 to evaluate the policy flags (i.e., the access decision previously made by the user) to determine whether or not to permit access. However, if the "CBP auto flags" are set for the application at step 604, this indicates that the user has elected to automatically apply certain policy settings recommended by the community based advisor service and the method proceeds to step 605.

If the "CBP auto flags" are set for an application at step 604, the method proceeds to step 605 to evaluate whether or not the advice received from the community advisor service is current. More particularly, a check is made to determine if the "CBP TTL" has expired. Advice supplied by the community advisor service is supplied together with (or subject to) a "Time-To-Live" or "UTL". "Time-To-Live" is a field in the Internet Protocol (IP) that is used in the currently preferred embodiment of the present invention to indicate how long the advice is deemed to be reliable. For instance, if a particular application had only been evaluated by a relatively small number of users, the advice may be deemed less reliable and a shorter "TIL" is usually established to require users to make more frequent checks with the community advisor service to determine whether or not the advice previously supplied remains accurate. On the other hand, a longer Time-To-Live is typically used if advice is more reliable (e.g., a well known product that has been categorized in the same manner for an extended period of time). Obviously, the present invention could provide for advice to be checked every time instead of utilizing this Time-To-Live field, but the presently preferred method is to rely on advice for a period of time in order to avoid the delay and overhead inherent in checking with the community advisor service in response to every request for access. If the "CBP TTL" has not expired at step 605, the method proceeds to step 608 to evaluate the advice previously received from the community advisor service. However, if the CBP Time-To-Live has expired, the method proceeds instead to step 606 to obtain updated information from the community advisor service.

At step 606, a request is made to the community advisor service to obtain information regarding whether or not other users recommend allowing Internet access by the specified application. This request to the community advisor service may be initiated if step 605 determined that the "TTL" of the advice previously received had expired or, alternatively, if a new application was involved and step 603 determined that "global autosettings" flags were set. When the CBP result (i.e., advice) is received in response to this request, at step 607 a check is made to determine whether or not the result is valid. The result may, for example, not be valid if access to the community advisor service could not be obtained. In the event the result is not valid, then the method proceeds to step 611 to issue an alert to the user interface for a decision on whether or not to permit access. However, if step 607 determines that the CBP result is valid, the method proceeds to step 608.

At step 608, "policy" flags are evaluated to determine whether or not to permit access. The policy flags represent a decision made either manually by a user or automatically based upon the community advisor service regarding the access rights of a particular program (e.g., application program). As previously described, if steps 602 and 604 indicate that a policy was manually set by the user for a given program (or component), the policy established by the user is applied at step 608. Alternatively, if the user had elected to rely on the community recommendation, the community recommendation is applied. In the currently preferred embodiment, there are three possible policy settings that may apply for governing access to the Internet by a particular application. If the policy setting is "deny", the method proceeds to step 609 and access to the Internet by this application is blocked. On the other hand, if the policy setting is "allow", the method proceeds to step 610 and the application is allowed to connect to the Internet. The third setting of the currently preferred embodiment is "ask" (in other words, ask the user for a decision as previously described). If evaluation of the policy flags at step 608 determines that the setting is "ask", the method proceeds to step 611.

Step 611 provides for the display of an alert to the user (e.g., a pop-up window in the user interface) asking for a decision to be made as to whether or not to permit access to the Internet by this application. Examples of pop-up windows illustrating alerts which may be provided to a user have been previously shown at FIGS. 5D-E. The alert pop-up window typically includes advice and recommendations from the community advisor service (if available). The user may consider the community recommendation in making his or her determination as to whether or not to allow access by this application. The user may also elect to adopt the same rule for governing future requests by this application by selecting the "remember this answer button" as previously illustrated at FIGS. 5D-E. The operation of various components of the currently preferred embodiment of the system of the present invention will now be described in more detail.

Operations of System Components

Client User Interface

The currently preferred client user interface (UI) of the present invention includes several components and modules. One component is a main program control panel providing the ability to enable or disable the community advisor service (CBP) as described above and illustrated at FIG. 5A. An updated "programs" detail panel (under the main program control panel) includes an advice column for displaying the "community rating" (i.e., the recommended policy setting) for each program as shown at FIG. 5B. The CBP custom dialog panel illustrated at FIG. 5C enables a user to specify that community recommendations should be automatically accepted. The user may also use this panel to select when the permission dialog should be presented to the user (i.e., an alert issued to the user interface) and to set the thresholds for reliance upon community advice. In the currently preferred embodiment, an expert dialog panel provided during installation process allows a user to elect to participate in the community advisor service (CBP system). The user may also set the automatic acceptance settings (e.g., the percentage of users to rely upon as to whether or not to permit access). This dialog also asks the user to self-qualify as a beginning user, intermediate user, or expert user. An updated program permission dialog that shows the recommendation provided by the community advisor service is currently implemented as a color-coded CBP bar on alerts issued to the user interface (as previously shown at FIGS. 5D-E). The dialog also has an additional context sensitive link to obtain more information as illustrated below:

[t1]

| CBP Status | CBP Link | Comment |
|---|---|---|
| Awaiting CBP server response | Link to generic CBP info page | This is the default when the application permission dialog comes up. Once information from the CBP server has been received, the status changes. |
| CBP recommends "Yes" | Link to generic CBP info page | Color-coded CBP bar showing the percent of users "voting yes" The "Yes" button becomes default. |
| CBP recommends "No" | Link to generic CBP info page | Color-coded CBP bar showing the percent of users "voting no" The "No" button becomes default. |
| CBP service disabled | Link to Programs Main panel. | |
| CBP only available in ZAP | Link to upgrade page | |
| CBP server down | Link to server status page | |
| CBP has not enough info | Link to generic CBP info page | |
| ZAP license bad | Link to buy license page | |
| ZAP license expired | Link to renew license page | |

Client Application and Module Permissions

In order to allow for the above-described automatic application permissions, the rules engine of the presently preferred embodiment includes the following Internet permission flags:

| Permission flag | Value | Comment |
|---|---|---|
| 1: CONNECT_DISALLOW_WAN | 0x0000 | |
| 2: CONNECT_ALLOW_WAN | 0x0001 | |
| 3: CONNECT_ASK_WAN | 0x0002 | |
| 4: CONNECT_AUTO_WAN | 0x0004 | New flags indicating that CBP automatically allowed Internet access |
| 5: LISTEN_DISALLOW_WAN | 0x0000 | |
| 6: LISTEN_ASK_WAN | 0x0040 | |
| 7: LISTEN_ALLOW_WAN | 0x0080 | |
| 8: LISTEN_AUTO_WAN | 0x0008 | New flags indicating that CBP automatically allowed Internet server access |
| 9: CONNECT_DISALLOW_LAN | 0x0000 | |
| 10: CONNECT_ALLOW_LAN | 0x0100 | |
| 11: CONNECT_ASK_LAN | 0x0200 | |
| 12: CONNECT_AUTO_LAN | 0x0400 | New flags indicating that CBP automatically allowed LAN acces |
| 13: LISTEN_DISALLOW_LAN | 0x0000 | |
| 14: LISTEN_ASK_LAN | 0x4000 | |
| 15: LISTEN_ALLOW_LAN | 0x8000 | |
| 16: LISTEN_AUTO_LAN | 0x0800 | New flags indicating that CBP automatically allowed LAN serve access |

In addition, the application permission data structure has the following additional fields:

| Field | Type | Range | Comment |
|---|---|---|---|
| 1: CBP_TTL | Date | | Time-To-Live for CBP automatic settings |
| 2: CBP_STATUS | Word | | See CBP status values below |
| 3: CBP_CONNECT_ALLOW_LAN | Word | 0-99 | Percent of users allowing LAN access |
| 4: CBP_LISTEN_ALLOW_LAN | Word | 0-99 | Percent of users allowing server LAN access |
| 5: CBP_CONNECT_ALLOW_WAN | Word | 0-99 | Percent of users allowing WAN access |
| 6: CB_LISTEN_ALLOW_WAN | Word | 0-99 | Percent of users allowing server WAN access |

The "CONNECT_AUTO_xxx" and "LlSTEN_AUTO_xxx" flags illustrated above are for indicating that the specific permission has been generated automatically and is subject to a Time-To-Live (TTL) check via the "CBP_TTL" field. In the event that the Time-To-Live has expired, the rules engine contacts the query server of the community advisor service to refresh the settings for that program (e.g., application program). The above "CONNECT_AUTO_xxx" and "LISTEN_AUTO_xxx" flags are only set if the community advisor service (or CBP) is enabled, the lookup of advice from the community advisor service is successful, the user has not yet been prompted, and the respective application (program) permission is set to "CONNECT_ASK_xxx" or "LISTEN_ASK_xxx".

The following CBP status field shows the status of the last CBP lookup or lookup attempt from the query server of the community advisor service (CBP):

| CBP Status | Value | Comment |
|---|---|---|
| 1: CBP_STATUS_OK | 0x0001 | Successful CBP lookup |
| 2: CBP_STATUS_MALICIOUS | 0x0002 | Program/module is malicious. |
| 3: CBP_STATUS_PENDING | 0x0003 | Lookup pending |
| 4: CBP_STATUS_NO_INFO | 0x0004 | CBP doesn't have enough info for this application |

-continued

| CBP Status | Value | Comment |
| --- | --- | --- |
| 5: CBP_STATUS_DISABLED | 0x8001 | CBP access was disabled |
| 6: CBP_STATUS_INIT_PENDING | 0x8002 | CBP is enabled but has not yet received a key |
| 7: CBP_STATUS_INIT_FAILED | 0x8003 | CBP enabling failed |
| 8: CBP_STATUS_SERVER_TIMEOUT | 0x8011 | Server timed out |
| 9: CBP_STATUS_SERVER_UNREACHABLE | 0x8012 | Server unreachable |
| 10: CBP_STATUS_NO_LICENSE | 0x8021 | Not licensed for CBP access |
| 11: CBP_STATUS_LICENSE_EXPIRED | 0x8022 | License expired |
| 12: CBP_STATUS_NO_ZA | 0x8023 | ZAP required |

As shown above, there are several instances in which the community advisor service (CBP) may be unavailable. A "CBP_STATUS_SERVER_UNREACHABLE" status, for instance, indicates that the community advisor service could not be reached when the last look-up attempt was made. A successful look-up is indicated by a status of "CBP_STATUS_OK".

Policy Submission and Queries

The process for gathering advice and recommendations from the user community is structured like a voting process. All "participants" in the community advisor service (CBP system) periodically submit their policies to a server or group of services comprising the CBP system. The system then evaluates the submitted information to determine the number of users that permit access by particular applications (programs) and the number of users that block access. The system is designed to ensure user privacy. It also includes safeguards to protect against double votes, votes by ineligible users, and so forth. Once a user decides to use the community advisor service, the voting process is transparent and requires no user interaction. Authorized users can also query the advisor database (i.e., the query server) and receive recommendations about whether or not to permit programs (or program modules or components) to access the Internet and/or other networks or resources. This process can be performed either automatically or manually as selected by the user (or an administrator) using the above-described application (program) permission dialog.

In the presently preferred embodiment, all communications between the client and the ballot server, the vote server, and the query server of the community advisor service are encrypted using a "CBP public key" (Client→Server) or "CBP private key" (Server→Client). The typical communication protocol is HTTP, port 80. The data itself is usually presented in Extensible Markup Language (XML) format. Compression may also be used for policy submissions. For safety reasons, internal communications between the ballot server, the vote server, and the query server are handled through a secure private network in the currently preferred embodiment.

Ballot Server

A primary purpose of the ballot server is to determine if a user/client is eligible to participate in the voting and/or query process. It is also designed to separate the client's license key information that can be used to track individual users from the actual information that a client submits in a vote or query. The ballot server typically maintains a single database that contains license keys, eligibility information, and information regarding whether clients have already received a vote ballot or query ticket such as the following:

| Field | Type | Comment |
| --- | --- | --- |
| 1: CBP_CLIENT_LICENSE_KEY | Char | License key in use |
| 2: CBP_CLIENT_LAST_BALLOT | Date | When did client received last ballot |
| 3: CBP_CLIENT_LAST_TICKET | Date | When did client received last ticket |
| 4: CBP_CLIENT_LAST_BALLOT | Date | When did client received first ballot |
| 5: CBP_CLIENT_LAST_TICKET | Date | When did client received first ticket |
| 6: CBP_CLIENT_FLAGS | Word | Flags to determine if the user is a verified expert user etc. 0001: Expert user |

The "CBP_CLIENT_FLAGS" field can be used to grant or deny particular privileges to a given user (for example to block certain users from voting even if they have a valid license key).

From time to time, participating clients (users) may submit one or more requests (i.e., ballots and/or tickets) to the ballot server. Each such request typically contains the client's license key and the other information described below that enables the ballot server to verify eligibility and may also be used in determining how to value vote submissions by the client:

| Field | Type | Comment |
| --- | --- | --- |
| 1: CBP_CLIENT_LICENSE_KEY | Char | License key in use |
| 2: CBP_CLIENT_REQUEST | Word | 0001: Request ballot 0002: Request ticket 0003: Request both |
| 3: CBP_CLIENT_VERSION | Char | ZA/ZAP version |
| 4: CBP_CLIENT_INSTALL_DATE | Date | When was ZA/ZAP installed |
| 5: CBP_CLIENT_OS | Word | OS version |
| 6: CBP_CLIENT_LANGUAGE | Word | Language page |
| 7: CBP_CLIENT_ASSESS | Word | Result of user self-qualification: 1: Beginning user 2: Intermediate user 3: Expert user |

Upon receipt of a request, the ballot server generally verifies the request by verifying that license key is valid (including verifying the license key has not expired). The ballot server also determines whether or not the license key indicates that the client is excluded (usually clients are only excluded from submitting votes to the vote server). Certain clients (e.g., a client with a trial version) may not be eligible to submit votes and in such cases a query ticket is returned, but not a ballot. In addition, certain other checks are made to protect against misuse of the system. For instance, a check is made to determine if a ballot or ticket request has already been received from this particular client (i.e., this same license key) in the last few days. Additional checks are made for other inconsistencies. Currently, the ballot server also determines the number of votes to be given to a particular ballot as described below.

After the above steps, the ballot server randomly generates a ballot and query ticket as appropriate and returns these ticket(s) to the client. The ballot and tickets typically contain the following information:

| Field | Type | Comment |
| --- | --- | --- |
| 1: CBP_BALLOT_ID | Char | Random generated by ballot server |
| 2: CBP_TICKET_ID | Char | Random generated by ballot server |
| 3: CBP_BALLOT_STATUS | Word | See CBP_STATUS_??? |
| 4: CBP_TICKET_STATUS | Word | See CBP_STATUS_??? |
| 5: CBP_BALLOT_NEXT | Date | Date when the next ballot is available (normally 7 days) |
| 6: CBP_BALLOT_NEXT | Date | Date when the next ticket is available (normally 7 days) |
| 7: CBP_BALLOT_MESSAGE | Char | Optional: Popup message for user. |

It should be noted that as a general rule, errors or determinations of ineligibility are not submitted to the client by the ballot server. In most cases, clients will receive a ballot with a status of "CBP_STATUS_OK". Any invalid or ineligible requests made by a client will normally result in a ballot that will not be counted by the vote server. In this manner a malicious user attempting to attack the system (e.g., submit unauthorized votes to influence the advice given by the system) will not learn if an attempt to pollute the voting database was successful. The client may then store the ballot and ticket for subsequent vote or query requests.

When a ballot is returned to a client, the ballot server also sends a ballot confirmation to the vote server. This ballot confirmation usually contains the following information:

| Field | Type | Comment |
| --- | --- | --- |
| 1: CBP_BALLOT_ID | Char | Random generated by ballot server |
| 2: CBP_BALLOT_EXPIRE | Date | Expiration date for ballot - normally 2 hours. |
| 3: CBP_BALLOT_COUNT | Word | Multiplier for ballot data. 0: Ignore ballot 1: Normal user >1: Super user |
| 4: CBP_BALLOT_NEXT | Date | Date when the next ballot is available (normally 7 days) |
| 5: CBP_CLIENT_VERSION | Char | ZA/ZAP version |
| 6: CBP_CLIENT_INSTALL_DATE | Date | Date when the client first received a ballot. |
| 7: CBP_CLIENT_OS | Word | OS version |
| 8: CBP_CLIENT_LANGUAGE | Word | Language page |
| 9: CBP_CLIENT_ASSESS | Word | Result of user self-qualification: 1: Beginning user 2: Intermediate user 3: Expert user |

The ballot server also sends a similar ticket confirmation to the query server as previously described. This ticket confirmation contains the following information:

| Field | Type | Comment |
| --- | --- | --- |
| 1: CBP_TICKET_ID | Char | Random generated by ballot server |
| 2: CBP_TICKET_EXPIRE | Date | Expiration date for ballot - normally 7 days. |

Vote Server

The vote server verifies, evaluates, and collects votes. In the currently preferred embodiment, these "votes" comprise particular security or configuration settings adopted by users of the program. For example, a may adopting an application permission setting that blocks access to the Internet by a particular program. This setting is considered as a "vote" against allowing Internet access by this program. The votes that are collected from participating users are then used to build the advisory database. Whenever the vote sever receives a ballot confirmation from the ballot server it adds it to the ballot database. The ballot confirmation typically contains the following information:

| Field | Type | Comment |
| --- | --- | --- |
| 1: CBP_BALLOT_ID | Char | Random generated by ballot server |
| 2: CBP_BALLOT_EXPIRE | Date | Expiration date for ballot - normally 2 hours. |

-continued

| Field | Type | Comment |
|---|---|---|
| 3: CBP_BALLOT_COUNT | Word | Multiplier for ballot data.<br>0: Ignore ballot<br>1: Normal user<br>>1: Super user |
| 4: CBP_BALLOT_NEXT | Date | Date when the next ballot is available (normally 7 days) |
| 5: CBP_CLIENT_VERSION | Char | ZA/ZAP version |
| 6: CBP_CLIENT_INSTALL_DATE | Date | Date when the client first received a ballot. |
| 7: CBP_CLIENT_OS | Word | OS version |
| 8: CBP_CLIENT_LANGUAGE | Word | Language page |
| 9: CBP_CLIENT_ASSESS | Word | Result of user's self-qualification:<br>0001: Beginning user<br>0002: Intermediate user<br>0003: Expert user |
| 10: CBP_BALLOT_FLAGS | Word | Maintenance flags<br>0001: Ballot voted |

Any expired or voted ballots are periodically removed from the ballot database. If the client has received a valid ballot, the client prepares a vote of all submissions from its local rules database. All program (and program module or component) settings in the local rules database on the client device are included with a few exceptions. Programs and modules that have not been used within the last voting period are usually excluded, as are programs and modules that have the "CONNECT_AUTO_xxx" or "LISTEN_AUTO_xxx" flags set. Other exceptions include settings stored with respect to applications or modules that are no longer physically installed on the client device.

The client then submits the ballot containing the following information to the vote server:

| Field | Type | Comment |
|---|---|---|
| 1: CBP_BALLOT_ID | Char | Random generated by ballot server |
| 2: CBP_SUBMIT_COUNT | Word | Number of entries in submission |
| 3: CBP_SUBMIT_CRC | Char | CRC for submission data |
| 4: CBP Submission entry 1 | | See below |
| 5: CBP Submission entry n | | See below |
| 6: CBP_ENTRY_TYPE | Word | 1: Program 2: Module |
| 7: CBP_ENTRY_MD5 | Char | |
| 8: CBP_ENTRY_NAME | Char | File name of entry |
| 9: CBP_ENTRY_PUBLISHER | Char | Name of publisher |
| 10: CBP_ENTRY_VERSION | Char | Version info |
| 11: CBP_ENTRY_LANGUAGE | Word | Language ID |
| 12: CBP_ENTRY_FILE_DATE | Date | File date |
| 13: CBP_ENTRY_DB_DATE | Date | Date first in rules DB |
| 14: CBP_ENTRY_CONNECT_LAN | Word | 0: Prohibit, don't ask<br>10: Prohibit, ask next time<br>75: Allow, ask next time<br>100: Allow, don't ask |
| 15: CBP_ENTRY_LISTEN_LAN | Word | 0: Prohibit, don't ask<br>10: Prohibit, ask next time<br>75: Allow, ask next time<br>100: Allow, don't ask |
| 16: CBP_ENTRY_CONNECT_WAN | Word | 0: Prohibit, don't ask<br>10: Prohibit, ask next time<br>75: Allow, ask next time<br>100: Allow, don't ask |
| 17: CBP_ENTRY_LISTEN_WAN | Word | 0: Prohibit, don't ask<br>10: Prohibit, ask next time<br>75: Allow, ask next time<br>100: Allow, don't ask |

When the vote server receives a ballot it verifies the validity of the vote by evaluating whether or not the submission CRC is correct and determining if the ballot ID is in the ballot database. Checks are also made to determine that the ballot ID has not expired, the ballot has not already been voted, and the ballot count is not zero.

If the above conditions are not satisfied, the ballot is discarded. Otherwise, if the ballot is valid the vote server saves each vote entry into the vote database as follows:

| Field | Type | Comment |
|---|---|---|
| 1: CBP_BALLOT_ID | Char | Link into the ballot database |

-continued

| Field | Type | Comment |
|---|---|---|
| 2: CBP_ENTRY_TYPE | Word | 1: Program 2: Module |
| 3: CBP_ENTRY_MD5 | Char | |
| 4: CBP_ENTRY_NAME | Char | File name of entry |
| 5: CBP_ENTRY_PUBLISHER | Char | Name of publisher |
| 6: CBP_ENTRY_VERSION | Char | Version info |
| 7: CBP_ENTRY_LANGUAGE | Word | Language ID |
| 8: CBP_ENTRY_FILE_DATE | Date | File date |
| 9: CBP_ENTRY_DB_DATE | Date | Date first in rules DB |
| 10: CBP_ENTRY_CONNECT_LAN | Word | 0: Prohibit, don't ask<br>10: Prohibit, ask next time<br>75: Allow, ask next time<br>100: Allow, don't ask |
| 11: CBP_ENTRY_LISTEN_LAN | Word | 0: Prohibit, don't ask<br>10: Prohibit, ask next time<br>75: Allow, ask next time<br>100: Allow, don't ask |
| 12: CBP_ENTRY_CONNECT_WAN | Word | 0: Prohibit, don't ask<br>10: Prohibit, ask next time<br>75: Allow, ask next time<br>100: Allow, don't ask |
| 13: CBP_ENTRY_LISTEN_WAN | Word | 0: Prohibit, don't ask<br>10: Prohibit, ask next time<br>75: Allow, ask next time<br>100: Allow, don't ask |

Periodically the vote server tallies the votes, rebuilds the CBP advisor database and transmits the new database to the query server.

In the currently preferred embodiment, certain expert users or advisors are given more votes to favor such expert users in the voting process. For instance, an expert user may be given multiple votes while a beginning user is only given a single vote. This approach enables more experienced users to have a greater influence on the advice given by the user community. However, this is approach is not required for implementation of the methodology of the present invention. Those skilled in the art will appreciate that there a number of different ways in which the voting process may be structured. A simple one vote per user structure could be utilized if desired. The currently preferred approach is to provide for a weighted average based upon user self-assessment of their expertise (e.g., as beginner, intermediate, or expert), with more weight given to the opinion of expert users. However a number of other considerations may also be applied, if desired. For instance, rather then relying on self-assessment, one could provide that additional votes are only given to users having verified levels of expertise (e.g., users having completed an established technical certification program). Additional factors' such as the time the evaluation was made (e.g., to give more credit to more recent reviews), the number of programs evaluated by a particular user (e.g., to give more credit to users that have evaluated a greater number of programs), or the consistency of the user's past evaluations with the community recommendation could also be used in a weighted voting process if desired.

Currently, each entry in the vote database gets a number of votes that is determined based the following formula: CBP_VOTES=CBP_BALLOT_COUNT*CBP_CLIENT_ASSESS*MIN((Months in client rules DB+1), 5). The votes are then tallied and written into a rebuild the CBP query database (i.e., the query server of the community advisor service). Any entries in the vote database that have expired (e.g., the vote is older than "CBP_BALLOT_NEXT") are removed from the database. For each module or application (currently determined based upon a unique signature, such as that generated by using an MD5 checksum), the server adds all the "CBP_ENTRY_CONNECT-xxx" and "CBP_ENTRY_LISTEN_xxx" fields. The vote server then divides the result by the number of votes for that module or application. The number of entries for each application or module is also tallied in order to establish thresholds for "insufficient information" filtering. "Insufficient information" filtering provides for indicating that a community recommendation cannot be made (or if made, should be considered to be less reliable) for a particular program or module in the event that less than a minimum number of users have evaluated the program. Separate thresholds are generally established for all entries, entries per language, and entries per operating system (OS). After the votes have tallied, the advisor database then sends the new advisory database to the query server.

Query Server

The query server verifies client queries against the ticket database and returns the results based on the entries in the advisor database and advisor overwrite database. New query tickets (from the ballot server) are saved in the query ticket database. These tickets generally include the following:

| Field | Type | Comment |
|---|---|---|
| 1: CBP_TICKET_ID | Char | Random generated by ballot server |
| 2: CBP_TICKET_EXPIRE | Date | Expiration date for ballot - normally 7 days. |
| 3: CBP_TICKET_QUERY_COUNT | Word | Counter to establish optional thresholds. |

Expired entries in the query ticket database are periodically removed.

From time to time any client with a valid client ticket can send a query to the query server requesting information about one or more programs (e.g., application programs) or modules. The query provided by a client to the query server typically has the following format:

| Field | Type | Comment |
|---|---|---|
| 1: CBP_TICKET_ID | Char | Random generated by ballot server |
| 2: CBP_SUBMIT_COUNT | Word | Number of entries in submission |
| 3: CBP_SUBMIT_CRC | Char | CRC for submission data |
| 4: CBP_QUERY_HEADER_COOKIE | Word | Cookie to identify query |
| 5: CBP Submission entry 1 | See below | |
| 6: CBP Submission entry n | See below | |
| 1: CBP_ENTRY TYPE | Word | 1: Program 2: Module |

-continued

| Field | Type | Comment |
|---|---|---|
| 2: CBP_ENTRY_MD5 | Char | |
| 3: CBP_ENTRY_NAME | Char | File name of entry |
| 4: CBP_ENTRY_PUBLISHER | Char | Name of publisher |
| 5: CBP_ENTRY_VERSION | Char | Version info |
| 6: CBP_ENTRY_LANGUAGE | Word | Language ID |
| 7: CBP_ENTRY_FILE_DATE | Date | File date |
| 8: CBP_QUERY_ENTRY_COOKIE | Word | Cookie to identify query entry |

When the query server receives a query, the query server looks up the ticket identifier (ID) in the query ticket database. The query server verifies that the ticket ID is valid, the ticket ID has not expired, the query CRC is valid, and (optionally) that the client hasn't exceeded any applicable query quota. Optionally, these queries can also be digitally signed to avoid queries that have a valid ticket ID but originate from an unauthorized application.

In response to a query such as that described above, the query server looks up all the entries of a query in the advisor and/or the advisor overwrite database. The advisor and advisor overwrite databases normally contain the following information:

Another use of the advisor overwrite database is to mark known malicious applications. For example, one can compare information (e.g., MD5 information) from various intrusion detection (e.g., Tripwire by Tripwire, Inc. of Portland Oreg.), system security (e.g., Trojan Trap by Tiny Software, Inc. of Santa Clara, Calif.), or anti-virus products against entries in the advisor overwrite database to identify malicious applications.

After looking up information from both the advisor and the advisor overwrite databases, the query server returns the results to the client. The results can be returned in one or many transactions. Each transaction has a result header

| Field | Type | Comment |
|---|---|---|
| 1: CBP_ENTRY_TYPE | Word | 1: Program 2: Module |
| 2: CBP_ENTRY_MD5 | Char | |
| 3: CBP_ENTRY_NAME | Char | File name of entry |
| 4: CBP_ENTRY_PUBLISHER | Char | Name of publisher |
| 5: CBP_ENTRY_VERSION | Char | Version info |
| 6: CBP_ENTRY_LANGUAGE | Word | Language ID |
| 7: CBP_ENTRY_FILE_DATE | Date | File date |
| 8: CBP_ADVICE_DATE | Date | Date first in rules advisor DB |
| 9: CBP_ADVICE_UPDATE | Date | Date of last update |
| 10: CBP_ADVISE_CONNECT_LAN | Word | Advise ranking from 0 to 99 |
| 11: CBP_ADVISE_LISTEN_LAN | Word | Advise ranking from 0 to 99 |
| 12: CBP_ADVISE_CONNECT_WAN | Word | Advise ranking from 0 to 99 |
| 13: CBP_ADVISE_LISTEN_WAN | Word | Advise ranking from 0 to 99 |
| 14: CBP_ADVISE_VOTE_COUNT | Word | Number of votes |
| 15: CBP_ADVISE_SUBMIT_COUNT | Word | Number of submissions |
| 16: CBP_ADVICE_FLAGS | Word | 0001: Listen LAN overwritten<br>0002: Connect LAN overwritten<br>0004: Listen LAN overwritten<br>0008: Connect LAN overwritten |
| 17: CBP_ADVICE_SOURCE | Word | 0001: CBP vote<br>0002: Manual overwrite<br>0003: Tripwire<br>0004: TrojanTrap<br>0005: . . . |
| 18: CBP_ADVISE_STATUS | Word | CBP_STATUS_??? |
| 19: CBP_ADVICE_MESSAGE | Char | Optional user popup message |

One purpose of the advisor overwrite database is to allow manual edits or automatically generated overwrites of votes.

followed by one or more result entries having the following format:

| Field | Type | Comment |
|---|---|---|
| 1: CBP_RESULT_COUNT | Word | Number of entries in this result chunk |
| 2: CBP_RESULT_CRC | Char | CRC for result data |
| 3: CBP_RESULT_FLAGS | Word | 0001: Query complete |
| 4: CBP_QUERY_HEADER_COOKIE | Word | Cookie to identify query |
| 5: CBP Submission entry 1 | See below | |
| 6: CBP Submission entry n | See below | |

-continued

| Field | Type | Comment |
| --- | --- | --- |
| 1: CBP_ENTRY_TYPE | Word | 1: Program 2: Module |
| 2: CBP_ENTRY_MD5 | Char | |
| 3: CBP_ENTRY_NAME | Char | File name of entry |
| 4: CBP_ENTRY_PUBLISHER | Char | Name of publisher |
| 5: CBP_ENTRY_VERSION | Char | Version info |
| 6: CBP_ENTRY_LANGUAGE | Word | Language ID |
| 7: CBP_ENTRY_FILE_DATE | Date | File date |
| 8: CBP_QUERY_ENTRY_COOKIE | Word | Cookie to identify query entry |
| 9: CBP_ADVICE_DATE | Date | Date first in rules advisor DB |
| 10: CBP_ADVICE_UPDATE | Date | Date of last update |
| 11: CBP_ADVISE_CONNECT_LAN | Word | Advise ranking from 0 to 99 |
| 12: CBP_ADVISE_LISTEN_LAN | Word | Advise ranking from 0 to 99 |
| 13: CBP_ADVISE_CONNECT_WAN | Word | Advise ranking from 0 to 99 |
| 14: CBP_ADVISE_LISTEN_WAN | Word | Advise ranking from 0 to 99 |
| 15: CBP_ADVISE_STATUS | Word | CBP_STATUS_??? |
| 16: CBP_ADVICE_MESSAGE | Char | Optional user popup message |

To preserve bandwidth all "CBP_ENTRY_XXX" entries are usually omitted unless they are different from the original query. Upon receipt of the response to a query the user may then act on the information in determining whether or not to allow a program (or program component) to access resources (e.g., a network such as the Internet). For example, the information may be used to display the community recommendation (voting results) in the user interface as illustrated at FIGS. 5D-E. The user may then consider the community recommendation in deciding whether or not to permit access. Alternatively, client-side components of the present invention may automatically determine whether or not to permit access if the user has elected to rely upon community advice as previously described.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a system comprising a plurality of devices connected to a network, a method for regulating network access at a particular device, the method comprising:

providing at a plurality of devices connected to a network a security module for establishing security settings, said security settings for regulating network access at said plurality of devices;

collecting information about established security settings from at least some of said plurality of devices connected to the network;

in response to a request for network access at a particular device, determining whether or not to permit network access based, at least in part, upon the collected information about established security settings;

wherein said collecting step includes collecting information about whether a particular program is permitted to access the network; and wherein said determining step includes determining whether at least a majority of users permit a particular program to access the network.

2. The method of claim 1, wherein the network comprises the Internet.

3. The method of claim 1, wherein said security settings specify particular programs which are allowed network access.

4. The method of claim 1, wherein said security settings specify particular types of network access which are allowed.

5. The method of claim 1, wherein said step of establishing security settings includes obtaining user input as to whether a particular program should be allowed network access.

6. The method of claim 1, wherein said security module automatically transmits said information about established security settings to a repository at a machine on the network.

7. The method of claim 1, wherein said determining step includes determining whether a particular program requesting access is known to be a malicious program.

8. The method of claim 1, wherein said determining step includes the substeps of:

identifying a particular program requesting network access;

if said particular program is included in security settings established at the particular computer, determining whether to permit network access based upon said security settings at the particular computer; and otherwise, if said particular program is not included in said security settings at said particular computer, determining whether to permit network access based upon the collected security settings information.

9. The method of claim 1, wherein said request for network access comprises a request for access to the Internet.

10. The method of claim 1, wherein said determining step includes using a "firewall" application for selectively blocking network access.

11. In a system comprising a plurality of devices connected to a network, a method for regulating network access at a particular device, the method comprising:

providing at a plurality of devices connected to a network a security module for establishing security settings, said security settings for regulating network access at said plurality of devices;

collecting information about established security settings from at least some of said plurality of devices connected to the network;

in response to a request for network access at a particular device, determining whether or not to permit network access based, at least in part, upon the collected information about established security settings; and wherein said determining step includes determining a percentage of the collected security settings permitting access to the network.

12. The method of claim 11, further comprising:
automatically permitting network access if the percentage of the collected security settings permitting access exceeds a specified threshold.

13. The method of claim 11, further comprising:
automatically blocking network access if the percentage of the collected security settings permitting access is less than a specified threshold.

14. A system for managing access to resources on a per program basis, the system comprising:
a plurality of computers capable of connecting to resources;
a policy module enabling security policies to be defined at said plurality of computers;
a repository for collecting the security policies from said plurality of computers, said repository available to said plurality of computers;
an enforcement module for trapping a request for access to resources from a particular program at a particular computer and determining whether to permit access to the resources based, at least in part, upon security policies collected in said repository; and
wherein said enforcement module determines whether a particular program is permitted to access the resources under at least a majority of the security policies.

15. A system for managing access to resources on a per program basis, the system comprising:
a plurality of computers capable of connecting to resources;
a policy module enabling security policies to be defined at said plurality of computers;
a repository for collecting the security policies from said plurality of computers, said repository available to said plurality of computers;
an enforcement module for trapping a request for access to resources from a particular program at a particular computer and determining whether to permit access to the resources based, at least in part, upon security policies collected in said repository; and
wherein said enforcement module determines a percentage of the collected security policies permitting access to the resources.

16. The system of claim 15, wherein access to the resources comprises access to a network.

17. The system of claim 16, wherein the network comprises the Internet.

18. The system of claim 15, wherein said security policies specify particular programs which are allowed to access the resources.

19. The system of claim 18, wherein said security policies specify particular types of access which are allowed.

20. The system of claim 15, wherein said policy module provides for obtaining user input as to whether a particular program should be allowed to access the resources.

21. The system of claim 15, wherein said policy module automatically transmits said security policies to the repository.

22. The system of claim 15, wherein said policy module enables a user to automatically permit access to the resources if access is permitted under a specified percentage of the collected security policies.

23. The system of claim 15, wherein said enforcement module includes using a "firewall" component for selectively blocking access to the resources.

24. The system of claim 15, wherein said enforcement module displays the collected security policy information to a user to assist a user in deciding whether to permit access to the resources.

25. A method for assisting a user in configuring a program, the method comprising:
providing a configuration module at a plurality of computers connected to a network, the configuration module enabling a user to adopt a configuration setting for the program;
collecting at a computer on the network the configuration setting adopted by at least some users of the program at said plurality of computers;
generating a recommended configuration setting based upon the collected configuration settings;
displaying the recommended configuration setting at a particular computer connected to the network to assist a user in configuring the program; and
wherein said generating step includes determining the configuration setting adopted by at least a majority of users from which configuration settings are collected.

26. The method of claim 25, wherein said configuration setting includes whether a particular program is permitted to access the network.

27. The method of claim 25, wherein said configuration setting includes a security setting.

28. The method of claim 25, wherein said configuration module provides for obtaining user input as to whether a particular program should be allowed to access the network.

29. The method of claim 25, wherein said configuration module automatically transmits the configuration setting adopted by a user to the computer on the network collecting the configuration information.

30. The method of claim 25, further comprising:
automatically adopting the recommended configuration setting for configuration of the program at said particular computer.

31. The method of claim 25, wherein said displaying step includes displaying a recommended security setting in response to a request for access to the network at said particular computer.

32. A method for assisting a user in configuring a program, the method comprising:
providing a configuration module at a plurality of computers connected to a network, the configuration module enabling a user to adopt a configuration setting for the program;
collecting at a computer on the network the configuration setting adopted by at least some users of the program at said plurality of computers;
generating a recommended configuration setting based upon the collected configuration settings;
displaying the recommended configuration setting at a particular computer connected to the network to assist a user in configuring the program; and
wherein said generating step includes generating information about a percentage of users adopting a particular configuration setting.

33. A method for assisting a user in configuring a program, the method comprising:
providing a configuration module at a plurality of computers connected to a network, the configuration module enabling a user to adopt a configuration setting for the program;

collecting at a computer on the network the configuration setting adopted by at least some users of the program at said plurality of computers;

generating a recommended configuration setting based upon the collected configuration settings;

displaying the recommended configuration setting at a particular computer connected to the network to assist a user in configuring the program; and wherein generating step includes utilizing a weighted voting calculation.

34. In a system comprising a plurality of computers connected to a network, a method for managing network access, the method comprising:

providing a security module enabling security rules to be defined at said plurality of computers, said security rules identifying programs permitted to access the network;

collecting said security rules from said plurality of computers in a repository, said repository available to said plurality of computers;

trapping a request for access to the network from a particular program at a particular computer;

if said particular program is included in said security rules at said particular computer, determining whether to permit access to the network based upon said security rules at said particular computer; and otherwise, if said particular program is not included in said security rules at said particular computer, determining whether to permit access based upon said repository;

wherein said step of determining whether to permit access based upon said repository includes determining whether at least a majority of users permit a particular program to access the network.

35. The method of claim 34, wherein the network comprises the Internet.

36. The method of claim 34, wherein said security rules specify particular types of network access which are allowed.

37. The method of claim 34, wherein said step of enabling security rules to be defined includes obtaining user input as to whether a particular program should be permitted to access the network.

38. The method of claim 34, further comprising:

automatically blocking access to the network if at least a majority of users block a particular program from accessing the network.

39. The method of claim 34, further comprising:

utilizing an enforcement module for selectively permitting programs to access the network based upon the security rules.

40. The method of claim 34, further comprising:

regulating access to the network based upon the determination made about whether to permit access.

* * * * *